(12) United States Patent
Tillotson

(10) Patent No.: US 7,872,603 B2
(45) Date of Patent: Jan. 18, 2011

(54) METHOD AND APPARATUS FOR MAKING AIRBORNE RADAR HORIZON MEASUREMENTS TO MEASURE ATMOSPHERIC REFRACTIVITY PROFILES

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/204,293

(22) Filed: Sep. 4, 2008

(65) Prior Publication Data
US 2010/0052978 A1    Mar. 4, 2010

(51) Int. Cl.
*G01S 13/95* (2006.01)
*G01S 13/88* (2006.01)
*G01W 1/00* (2006.01)
*G01S 13/00* (2006.01)

(52) U.S. Cl. .............. 342/26 B; 342/26 R; 342/118; 342/134; 342/175; 342/195; 702/1; 702/2; 702/3

(58) Field of Classification Search ...... 342/26 R–26 D, 342/165, 173–175, 188–197, 159, 51–55, 342/118–145, 351–358; 702/1–3; 324/76.11, 324/76.12, 76.13, 76.14, 600, 629, 633, 636, 324/637, 639, 640, 642–646; 73/170.16, 73/170.28, 23.2, 24.01–24.06, 178 R, 170.27; 455/7, 11.1, 12.1, 13.1–13.4; 356/3, 4.01, 356/5.1, 5.11, 5.12, 128–137

See application file for complete search history.

(56) References Cited

U.S. PATENT DOCUMENTS 2,958,829 A * 11/1960 Hay ................... 73/170.28
3,039,355 A *  6/1962 Suter ................. 73/170.28
3,619,057 A * 11/1971 Castellano et al. ....... 356/5.11
3,688,189 A *  8/1972 Lamb ..................... 324/642

(Continued)

FOREIGN PATENT DOCUMENTS

EP         1717553         2/2006

(Continued)

OTHER PUBLICATIONS

J. P. Skura et al., "Radar Coverage Predictions Through Time- and Range-Dependent Refractive Atmospheres With Planetary Boundary Layer and Electromagnetic Parabolic Equation Models"; Paper from the IEEE International Radar Conference in 1990; IEEE Publication CH2882-9/90/0000-0370$1.00.*

(Continued)

*Primary Examiner*—Bernarr E Gregory
(74) *Attorney, Agent, or Firm*—Harness, Dickey & Pierce, P.L.C.

(57) ABSTRACT

A method for determining a refractivity profile of an atmosphere of the Earth. The method may involve: generating radar signals from a radar device located above the Earth's surface toward the Earth's surface; measuring a time of flight and a reflected intensity of reflected radar signals received back at the radar device; using the measured time of flight and the reflected intensity of the reflected radar signals received by the radar device to determine a distance to a radar horizon where the radar signals are tangent to the Earth's surface; and using the distance to the radar horizon to determine a refractivity profile of the atmosphere through which the radar signals and the reflected radar signals have travelled.

22 Claims, 17 Drawing Sheets

U.S. PATENT DOCUMENTS

| | | | |
|---|---|---|---|
| 3,715,748 A * | 2/1973 | Hicks | 342/26 D |
| 3,720,949 A * | 3/1973 | Richter | 342/26 D |
| 4,027,237 A * | 5/1977 | Heile | 324/636 |
| 4,028,942 A | 6/1977 | Gardiner | |
| 4,050,067 A * | 9/1977 | Elmore, Jr. | 342/191 |
| 4,093,918 A * | 6/1978 | Hitney | 702/2 |
| 4,099,878 A * | 7/1978 | Lee | 356/128 |
| 4,521,857 A | 6/1985 | Reynolds, III | |
| 4,873,481 A * | 10/1989 | Nelson et al. | 324/640 |
| 4,990,922 A | 2/1991 | Young et al. | |
| 5,077,558 A | 12/1991 | Kuntman | |
| 5,270,929 A * | 12/1993 | Paulson et al. | 702/3 |
| 5,276,453 A | 1/1994 | Heymsfield et al. | |
| 5,526,676 A * | 6/1996 | Solheim et al. | 73/170.27 |
| 5,592,171 A | 1/1997 | Jordan | |
| 5,631,414 A * | 5/1997 | Cherny | 73/170.27 |
| 5,675,081 A * | 10/1997 | Solheim et al. | 73/170.28 |
| 5,757,322 A | 5/1998 | Ray et al. | |
| 5,796,471 A | 8/1998 | Wilkerson et al. | |
| H001756 H * | 11/1998 | Lohrmann | 73/24.01 |
| 6,018,699 A | 1/2000 | Baron, Sr. et al. | |
| 6,028,514 A | 2/2000 | Lemelson et al. | |
| 6,043,756 A | 3/2000 | Bateman et al. | |
| 6,067,852 A * | 5/2000 | Alber et al. | 73/178 R |
| 6,184,816 B1 | 2/2001 | Zheng et al. | |
| 6,308,650 B1 | 10/2001 | Tsumiyama et al. | |
| 6,456,226 B1 | 9/2002 | Zheng et al. | |
| 6,505,123 B1 | 1/2003 | Root et al. | |
| 6,563,452 B1 | 5/2003 | Zheng et al. | |
| 6,707,415 B1 | 3/2004 | Christianson | |
| 6,731,906 B2 * | 5/2004 | Sokolovskiy et al. | 455/12.1 |
| 6,754,585 B2 | 6/2004 | Root et al. | |
| 6,799,014 B2 | 9/2004 | Rosen et al. | |
| 6,826,481 B2 | 11/2004 | Root et al. | |
| 6,833,805 B1 * | 12/2004 | Belen'kii et al. | 342/26 D |
| 6,853,331 B1 * | 2/2005 | Belen'kii et al. | 342/159 |
| 6,937,937 B1 | 8/2005 | Manfred et al. | |
| 6,943,699 B2 | 9/2005 | Ziarno | |
| 6,977,608 B1 | 12/2005 | Anderson et al. | |
| 7,069,147 B2 | 6/2006 | Manfred et al. | |
| 7,181,345 B2 | 2/2007 | Rosenfeld et al. | |
| 7,353,690 B2 * | 4/2008 | Solheim et al. | 342/26 R |
| 7,365,674 B2 | 4/2008 | Tillotson et al. | |
| 2002/0039072 A1 | 4/2002 | Gremmert et al. | |
| 2002/0155809 A1 * | 10/2002 | Sokolovskiy et al. | 455/12.1 |
| 2002/0168974 A1 | 11/2002 | Rosen et al. | |
| 2004/0043760 A1 | 3/2004 | Rosenfeld et al. | |
| 2005/0228763 A1 | 10/2005 | Lewis et al. | |
| 2006/0121893 A1 | 6/2006 | Tillotson et al. | |
| 2006/0155432 A1 | 7/2006 | Brown | |
| 2006/0164063 A1 * | 7/2006 | Solheim et al. | 324/76.14 |
| 2007/0069941 A1 | 3/2007 | Pearlman et al. | |
| 2007/0073486 A1 | 3/2007 | Tillotson et al. | |
| 2007/0162328 A1 | 7/2007 | Reich | |
| 2008/0178659 A1 | 7/2008 | Spinolli | |

OTHER PUBLICATIONS

P. Gerstoft et al., "Refractivity Estimation Using Multiple Elevation Angles"; IEEE Journal of Oceanic Engineering; vol. 28, No. 3; Jul. 2003; pp. 513-525.*

J. Fritz et al., "Retrieval of Surface-Layer Refractivity Using the CSU-CHILL Radar"; IEEE Publication 0-7803-9510-7/06/$20.00; copyright in the year 2006.*

Mizutani, K. et al. "Development of Coherent Doppler Lidar at CRL" Proceedings of the Spie—The International Society for Optical EngineeringSpie—Int. Soc. of Eng USA, vol. 4893, 2003, pp. 311-318.

Yee, Y. et al. "Neural Networks for Sensor Fusion of Meteorological Measurements" Proceedings of the Spie—The International Society for Optical Engineering Spie—Int. Soc. Eng USA, vol. 4385, 2001, pp. 77-86.

"Global Climate Research: Atmosperic Radiation Measurement-Unmanned Aerospace Vehicle (ARM-UAV)" Sandia National Laboratories Fact Sheet, [Online] Jun. 2004. Retrieved from the Internet: UR::http://www.ca.sandia.gov/pubs/factsheets/ARM-UAV2004.pdf.

Strahl, Jennifer et al. "Nowcast For The Next Generation Navy: Recent Progress In Naval Nowcast Technology" 20th International Conference On Interactive Information and Processing Systems (IIPS) For Meteorology, Oceanography, and Hydrology, [Online]Jan. 12, 2004. Retrieved from the Internet: URL:http://ams.confex.com/ams/pdfpapers/69718.pdf, retrieved on Jan. 19, 2007.

Wilkerson, T. et al. "Lidar Profiling of Aerosols, Cloud, and Winds by Doppler and Non-Doppler Methods" Amos Conference, Maui, HI, [Online] Oct. 2002. Retrieved from the Internet:URL:http://harlie.gsfc.nasa.gov/IHOP2002/Pub&Pats/AMOS%202002%20final.pdf- , retrieved on Jan. 19, 2007.

Cordes, J.J. and Flanagan, A., 1995: Economic Benefits and Costs of Developing and Deploying a Space-based Wind Lidar, Final Report, NWS Contract No. 43AAnW400223. George Washington University.

Masters, Dallas, et al., GPS Signal Scattering from Land for Moisture Content Determination, date unknown, 3 pgs.

Garrison, James L. and Katzberg, Stephen J. The Application of Reflected GPS Signals to Ocean Remote Sensing, Remote Sensing of Environment (2000), pp. 175-187, vol. 73, Elsevier Science Inc., New York USA.

Rocken, Christian, Special Study Group 2.161 Report Report Probing the Atmosphere by GPS; date unknown, pp. 1-12, COSMIC program Office University Corp. for Atmospheric Research (UCAR), Boulder, CO USA.

Ware, R., et al. "Real-Time Water Vapor Sensing with SuomiNet—Today and Tomorrow", International GPS Meteorology Workshop, Tsukaba, Japan, Jan. 14-16, 2003, pp. 1-6.

Ware, Randolph H., et al. SuomiNet: A Real-Time National GPS Network for Atmospheric Research and Education, Bulletin of the American Meteorological Society, vol. 81, 2000.

Coster, A.J., et al. "The Westford Water Vapor Experiment: Use of GPS to Determine Total Precipitable Water Vapor," ION $52^{nd}$ Annual Meeting, Cambridge, MA Jun. 19-21, 1996, 11 pages.

Thompson, D. R., et al. "Surface Roughness Estimation from GPS Sea Reflections", NASA Earth Science Enterprise, IEEE Geoscience and Remote Sensing Symposium, 2002, pp. 1-3.

Yuichi Aoyama; Shoji, T. Yoshihara; S. Danno, and T. Tsuda. Mountaintop GPS Observations: Downward Looking GPS Occultation Measurement on the Top of Mt. Fuji presented at Colloquium on Atmospheric Remote Sensing using the Global Positioning System, Boulder, Colorado, Jun. 20-Jul. 2, 2004, 27 pages. http://www.cosmic.ucar.edu/colloquium_2004/presentations/aoyama23Jun04.pdf.

Yoshihara, T.; Fujii, N.; Hoshinoo, K.; Matsuaga, K.; Sakai, Saitoh, S.; T.; Toshitaka, T.; Aoyama, Y.; Danno, S. "Measurement System of Airborne-Based GPS Downward-Looking Occultation and Experimental Results", research supported by Japan Ministry of Education, Culture, Sports, Science and Technology, XXVIIIth General Assembly of International Union of Radio Science (URSI), New Delhi, India, Oct. 2005, 4 pages. http://www.Ursi.org/Proceedings/ProcGA05/pdf/F08.9(01156).pdf.

Thayer, Gordon D. "An Improved Equation for the Radio Refractive Index of Air", Radio Science, vol. 9, No. 10, Oct. 1974, p. 803-807.

Lesne, O., et al. "Sensitivity Analysis for Airborne Sounding of the Troposphere by GNSS Radio Occulation", Physics and Chemistry of the Earth 27, 2002, p. 291-299.

Yoshihara, Takayuki et al. "Measurement System and Experimental Results of Airborne-based Downward-looking GPS Occulation," research supported by Japan Ministry of Education, Culture, Sports, Science and Technology, 8 pages.

http://www.ghcc.msfc.nasa.gov/sparcle/sparcle.sub.--quotes2.html, Are Space-Based Global Winds Desired? Sparkle Quotes (2) NASA, May 20, 2005.

http://www.ipo.noaa.govl, What Is NPOESS? NOAA Satellite and Information Service, May 20, 2005, pp. 1-3.

* cited by examiner

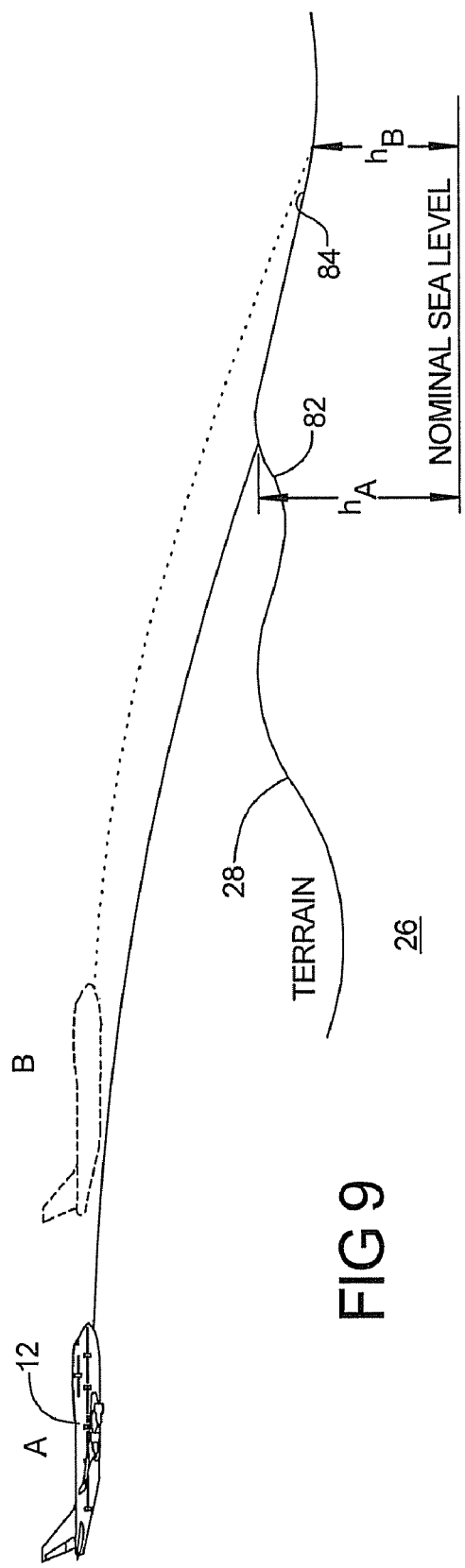

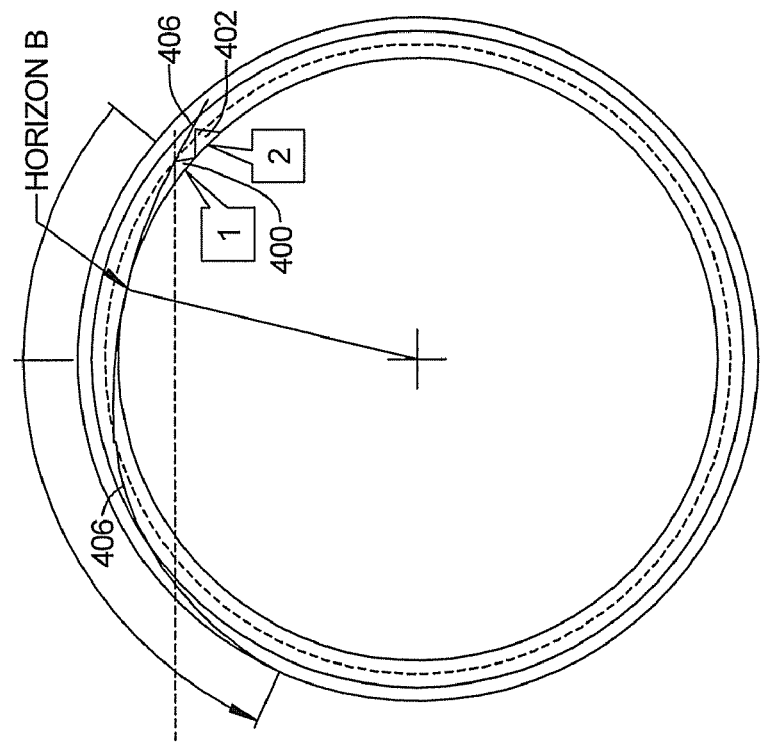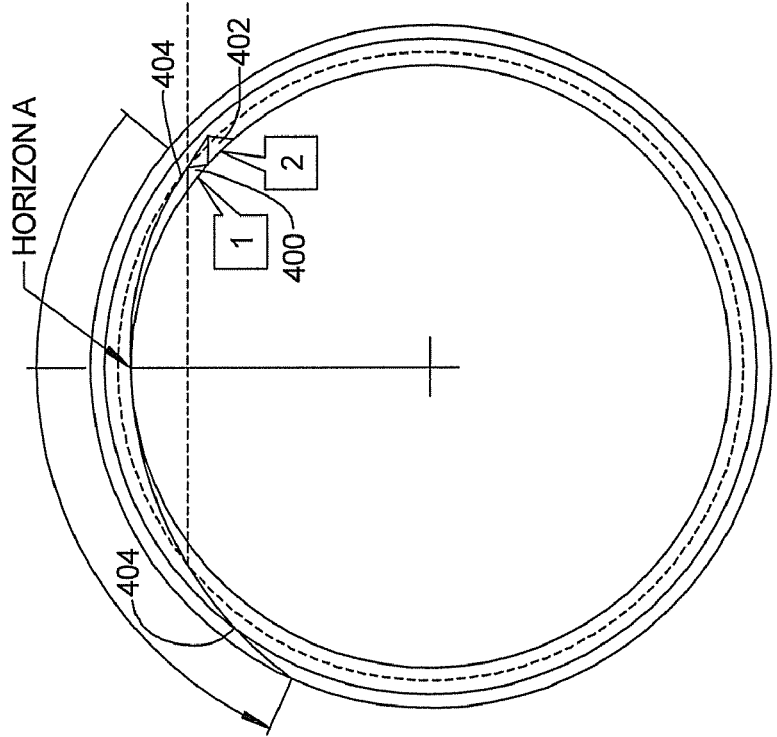

METHOD AND APPARATUS FOR MAKING AIRBORNE RADAR HORIZON MEASUREMENTS TO MEASURE ATMOSPHERIC REFRACTIVITY PROFILES

FIELD

The present disclosure relates to systems and methods for measuring temperature and humidity levels, and more particularly to a system and method that makes use of an airborne mobile platform having a radar unit that measures temperature and humidity profiles.

BACKGROUND

The statements in this section merely provide background information related to the present disclosure and may not constitute prior art.

There is growing interest in being able to obtain weather related information through the use of airborne mobile platforms, for example through the use of jet aircraft. More specifically, there is growing interest in being able to measure temperature and humidity at altitudes from the Earth's surface, such as an ocean surface, up to the cruising altitude of the mobile platform.

Previously developed airborne systems have relied on performing atmospheric measurements through the use of the Global Positioning System (GPS) or through Iridium signals reflected from the ocean's surface. This method relies on changes in index of refraction as the temperature and humidity of the air in the column between the ocean's surface and the aircraft vary. However, this method requires that new antennas and new electronics devices be installed on an aircraft. This raises the cost of implementing (or retrofitting) such a weather measurement system on an existing aircraft. Thus, it is a highly desirable goal to be able to implement such a system using as many existing electronic components on the aircraft as possible.

Various other devices and systems for predicting atmospheric conditions have been used. Such devices and methods include the use of radiosondes (i.e. weather balloons) to measure temperature, humidity and other variables from the ground surface up to fairly high altitudes. Drop parachutes, which can be viewed as the equivalent of radiosondes, have also been deployed from aircraft while in flight. GPS occultation measurements have also been made from low orbiting satellites, such as the COSMIC constellation of six satellites.

Radiosonde measurements are effective but their use is limited to industrialized countries over land. The infrastructure to routinely launch and monitor them is lacking in many nations, and this method is not well suited to monitoring atmospheric conditions over the oceans. Thus, this method is generally not usable over a large portion of the Earth covered by the oceans.

Dropping small parachute packages from aircraft is technically effective, but is costly over time and may raise environmental issues.

GPS occultation with satellites makes effective measurements only at fairly high altitudes. The GPS signal is too weak to effectively traverse the lower atmosphere with enough quality to allow an occultation measurement. In addition, the spatial and temporal coverage of LEO satellite constellations is too sparse to allow comprehensive coverage.

GPS or Iridium occultation measurements from aircraft provide better coverage than measurements from satellites. Measurements also reach somewhat lower altitudes because the signal does not need to traverse the entire atmosphere twice. However, the cost to install additional antennas and occultation receivers is a limitation when considering this type of system.

Reflected signal occultation is technically better than standard occultation. The reflected signal, especially using Iridium satellites, reaches all the way to the surface, allowing a full profile of the atmosphere to be measured. However, as with standard occultation, this method requires adding antennas and receivers to the aircraft and therefore has a relatively significant cost.

SUMMARY

In one aspect the present disclosure relates to a method for determining a refractivity profile of an atmosphere of the Earth. The method may comprise: generating radar signals from a radar device located above the Earth's surface toward the Earth's surface; measuring a time of flight and a reflected intensity of reflected radar signals received back at the radar device; using the measured time of flight and the reflected intensity of the reflected radar signals received by the radar device to determine a distance to a radar horizon where the radar signals are tangent to the Earth's surface; and using the distance to the radar horizon to determine a refractivity profile of the atmosphere through which the radar signals and the reflected radar signals have travelled.

In another aspect the present disclosure relates to a method for determining a refractivity profile of an atmosphere of the Earth. The method may comprise: generating radar signals from a radar device located on an airborne mobile platform toward the Earth's surface, and over a plurality of range gates; receiving ones of the radar signals that are reflected back to the radar device; measuring a time of flight and a reflected intensity of the radar signals reflected back at the radar device; using the measured time of flight, the reflected intensity of the radar signals received by the radar device, to determine an approximate distance to a radar horizon where the radar signals are tangent to the Earth's surface; and assimilating the distance from the mobile platform to the radar horizon, and at least one additional, non-radar based measurement to determine a refractivity profile of the atmosphere through which the radar signals have travelled.

In still another aspect the present disclosure relates to a system for determining a refractivity profile of an atmosphere of the Earth. The system may comprise: a radar device located at an elevated location providing a view of the Earth's horizon, being adapted to radar signals toward the Earth's surface; a processor adapted to analyze time of flight information for ones of said radar signals reflected back to, and received by, said radar device, and adapted to analyze information relating to an intensity of said reflected ones of said radar signals to determine a refractivity profile for a portion of an atmosphere of said Earth that said radar signals have travelled through.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The geometrical optics (GO) limit of the Kirchhoff cross section given by equation (2) is merely a high-frequency limit of the Kirchhoff integral of equation (2). It has been shown that in this limit the Kirchhoff integral is proportional to the joint probability density function (pdf) of the surface slopes even if the surface does not follow Gaussian statistics. The GO limit of equation (2) reads:

$$\sigma_{pq}^0 = 2\pi T_{pq} W \cdot \frac{\vec{q}_H}{q_z}. \tag{5}$$

If one assumes that the joint pdf of surface slopes is Gaussian, then the pdf W has the form:

$$W(\vec{S}) = \frac{1}{2\pi\sqrt{|V|}} e^{-\frac{1}{2}{}^t S V^{-1} S}, \tag{6}$$

where the surface slope vector and the covariance matrix are defined as $$\vec{S} = \begin{array}{c} S_x \\ S_y \end{array} \text{ and } V = \begin{array}{cc} \kappa_{20} & \kappa_{11} \\ \kappa_{11} & \kappa_{02} \end{array}. \tag{7}$$

The small letter t as upper-left superscript in equation (6) denotes the algebraic transpose of a vector or a matrix. Vertical bars enclosing the covariance matrix indicate the determinant of the matrix. The $K_{lm}$'s represent the three possible slope moments which may be defined in terms of the 2-D surface height spectral density, $\psi(k)$, and the x- and y- components of the wavenumber, $k_1$ and $k_2$, respectively in the usual way by $$\kappa_{lm} = \int_0^{k_c} k_i k_j \psi(\vec{k}) d\vec{k}, \tag{8}$$

where l=2, m=0 for i=j=1; l=0, m=2 for i=j=2, and l=1, m=1 for i=1, j=2. In order to obtain the full slope moments including the contribution from waves on the order of or shorter than the wavelength of the GPS radiation (~0.2m), the integration limit, $k_c$, in equation (8) must be set to ∞. It has been found however that to obtain agreement with the Kirchhoff approximation given by equation (2), $k_c$, should be a function of not only the frequency of the scattered radiation, but also of the wind speed and specular scattering angle.

The GO model is very appealing for use in numerical experiments owing to its simplicity and ease of implementation. In addition, in most cases it is amenable to exact analytical evaluation. A generalization of this model is needed however to broaden its domain of applicability to include more realistic scattering situations involving microwave radiation. It has been found that if the integration limit $k_c$ is chosen to be:

$$k_c = \frac{q_z}{15} 1 + \frac{U_{10}}{20}, \tag{9}$$

good agreement between the Kirchhoff cross section as computed by equation (2) and the GO cross section from equation (5) is obtained. As already mentioned, the expression for $k_c$ given by equation (9) is a function of wind speed ($U_{10}$) and incidence angle ($q_z$ at the specular point is $2k_0 \cos\theta_1 \cos$ where $k_0$ is the wavenumber of the incident radiation.) as well as radar frequency. This value for the cutoff wavenumber can be rather different from $k_c = k_0/3$ commonly used by other models.

Figure 1:
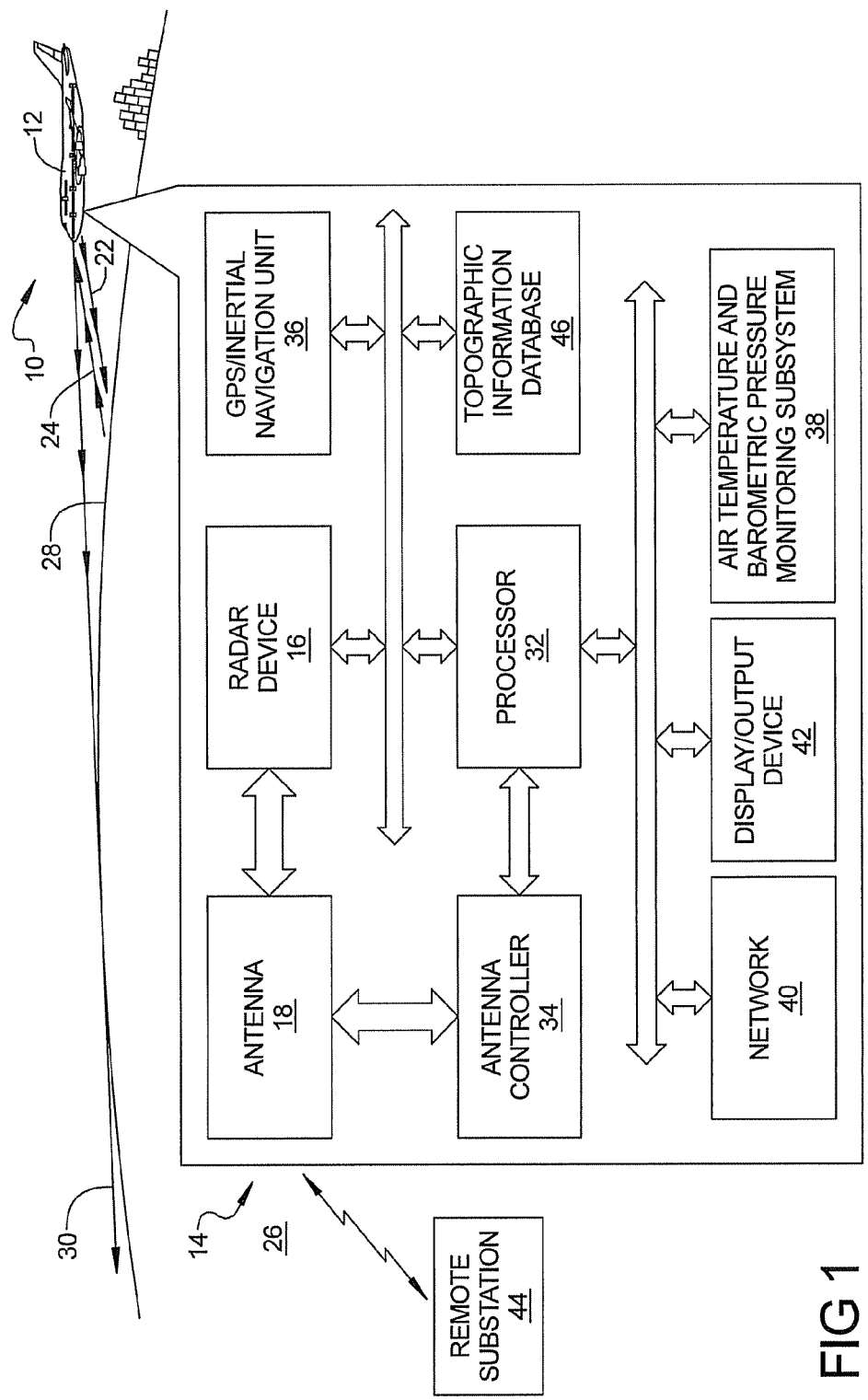
Figure 2:
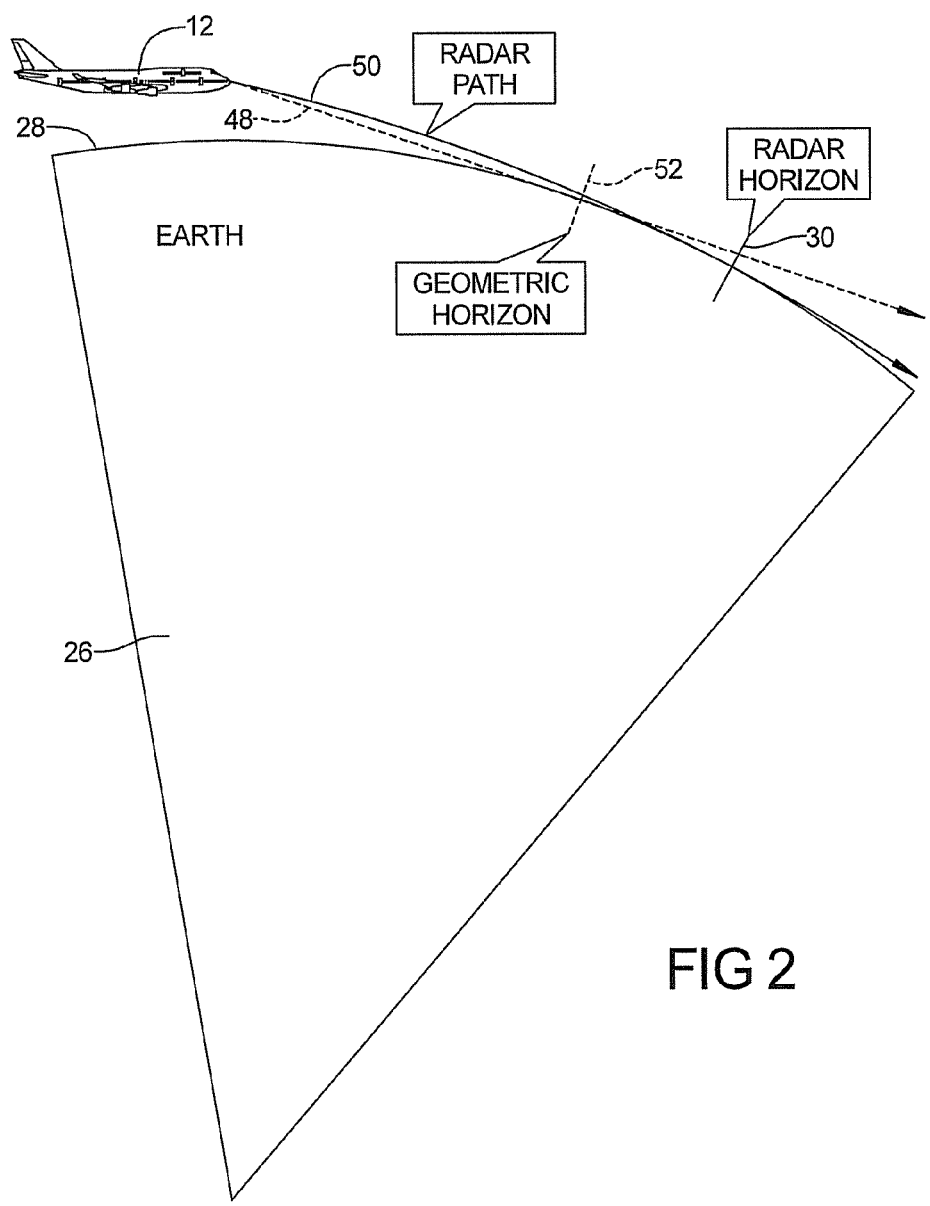
Figure 3:
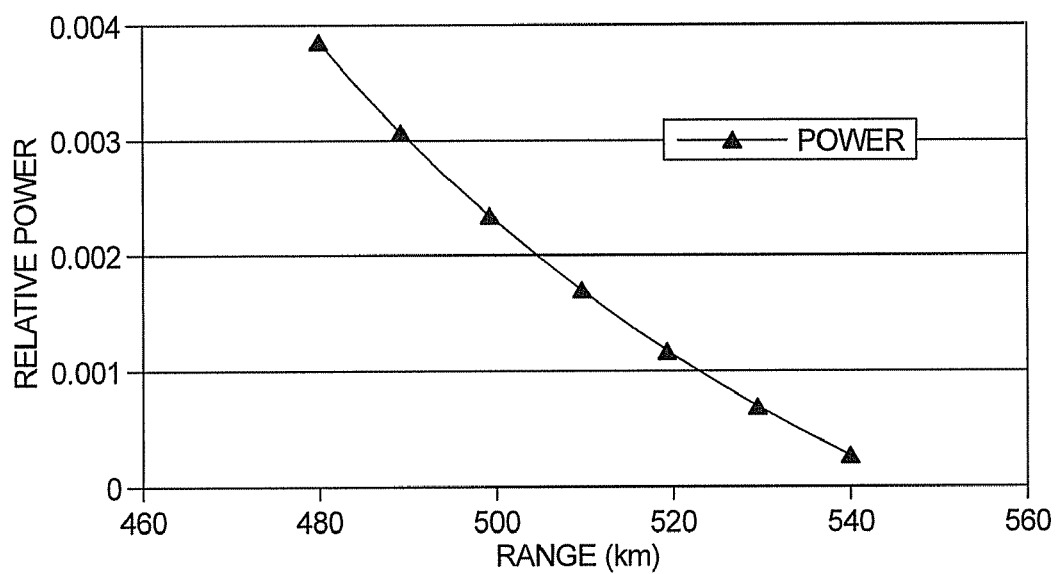
Figure 4:
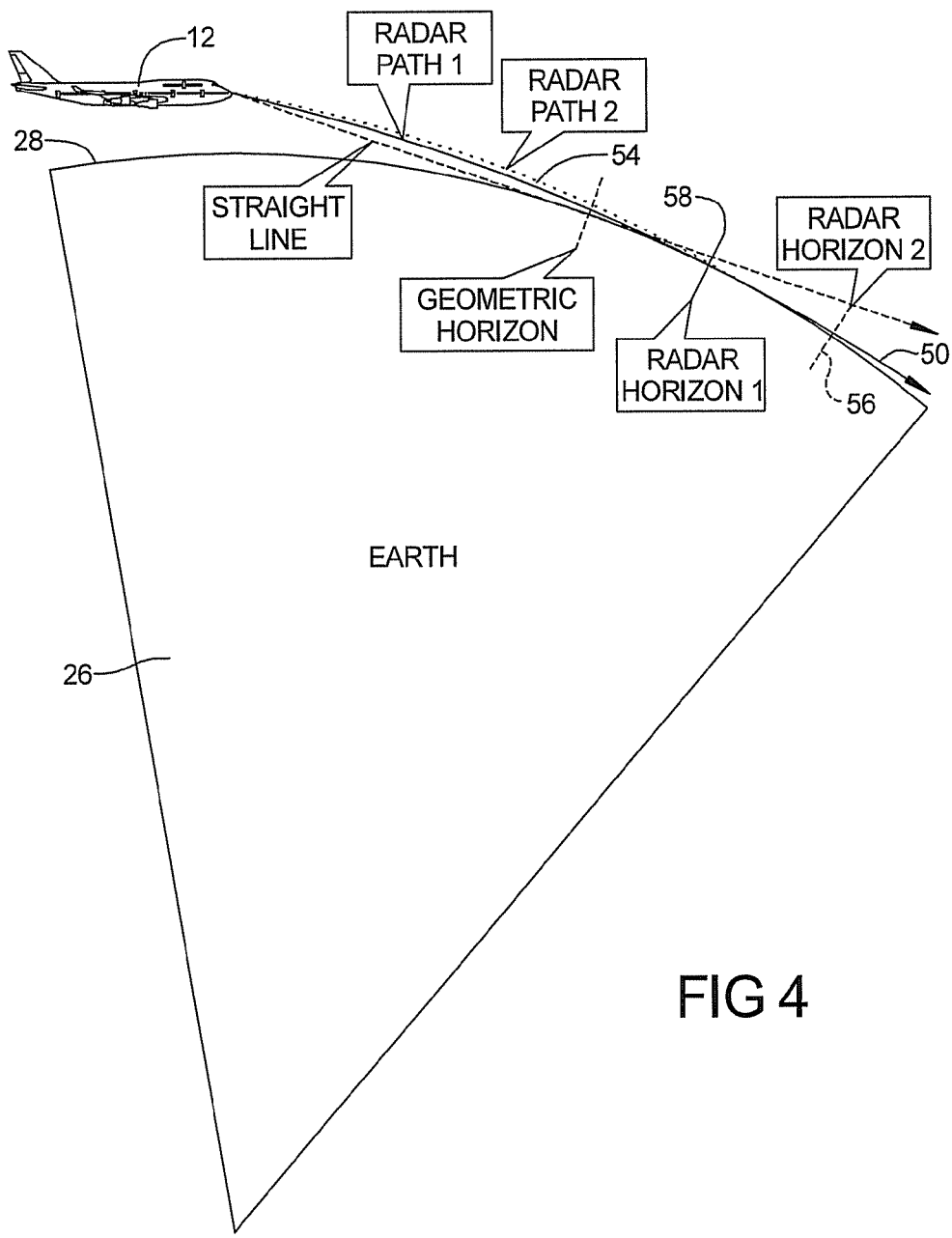
Figure 5:
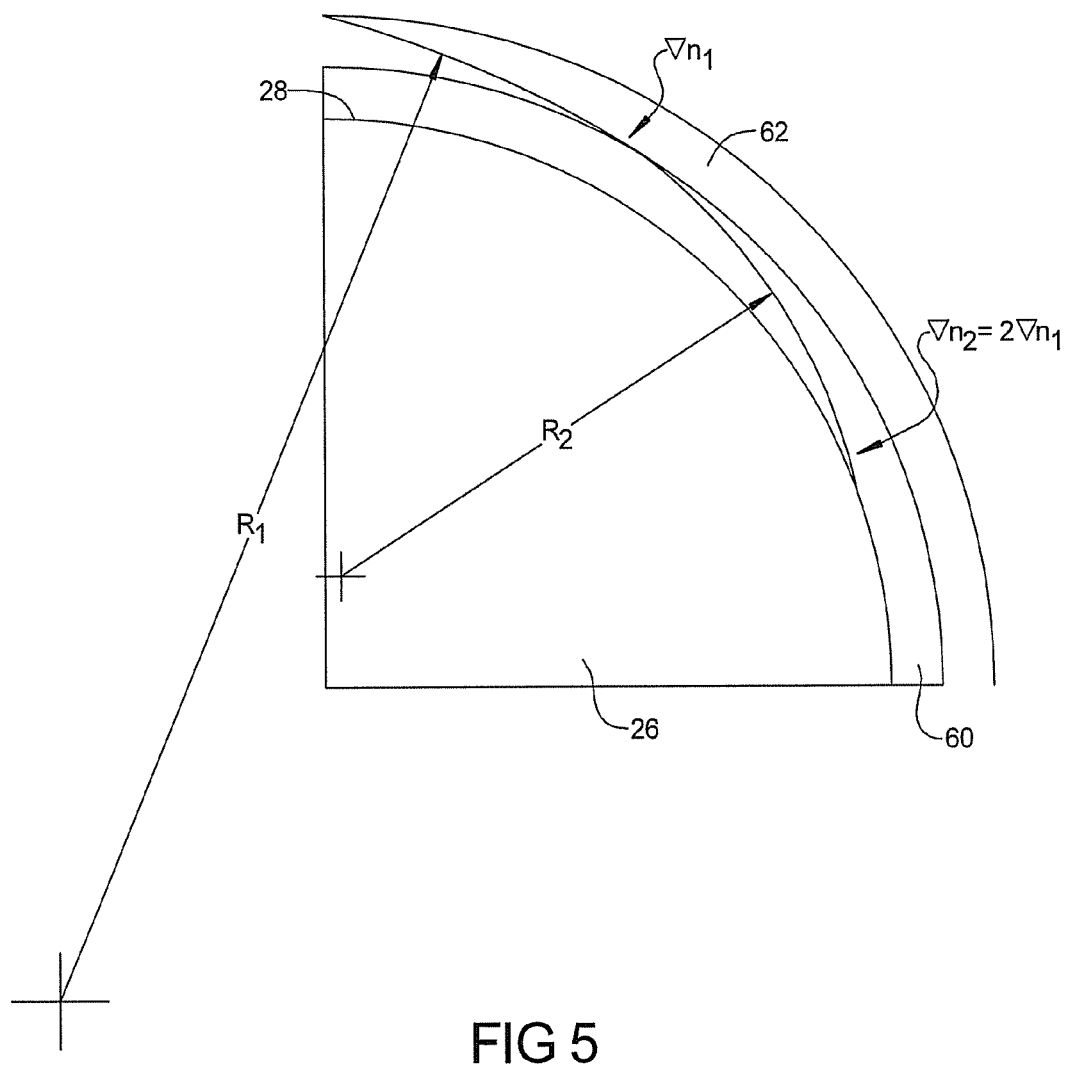
Figure 6:
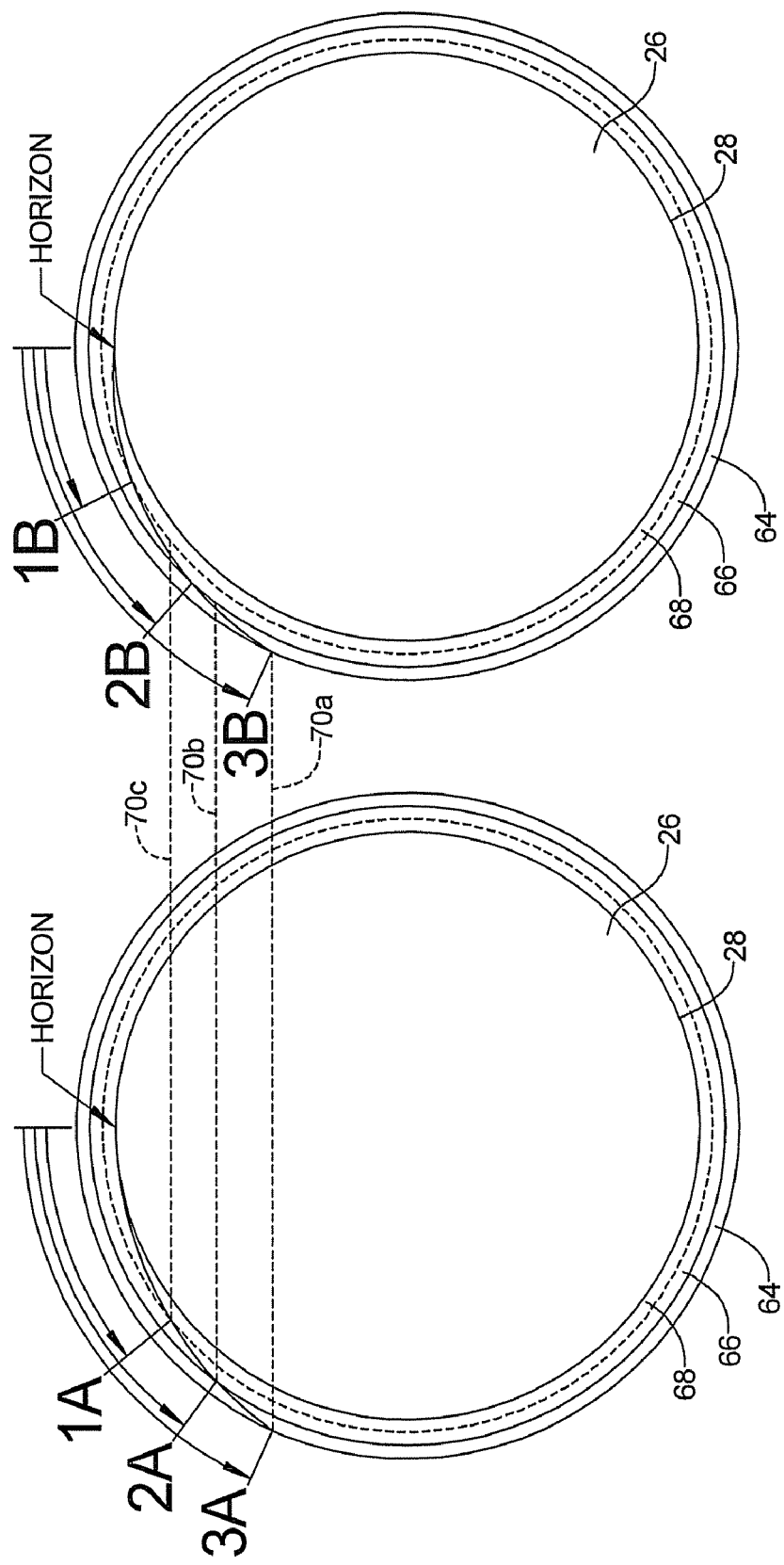
Figure 7:
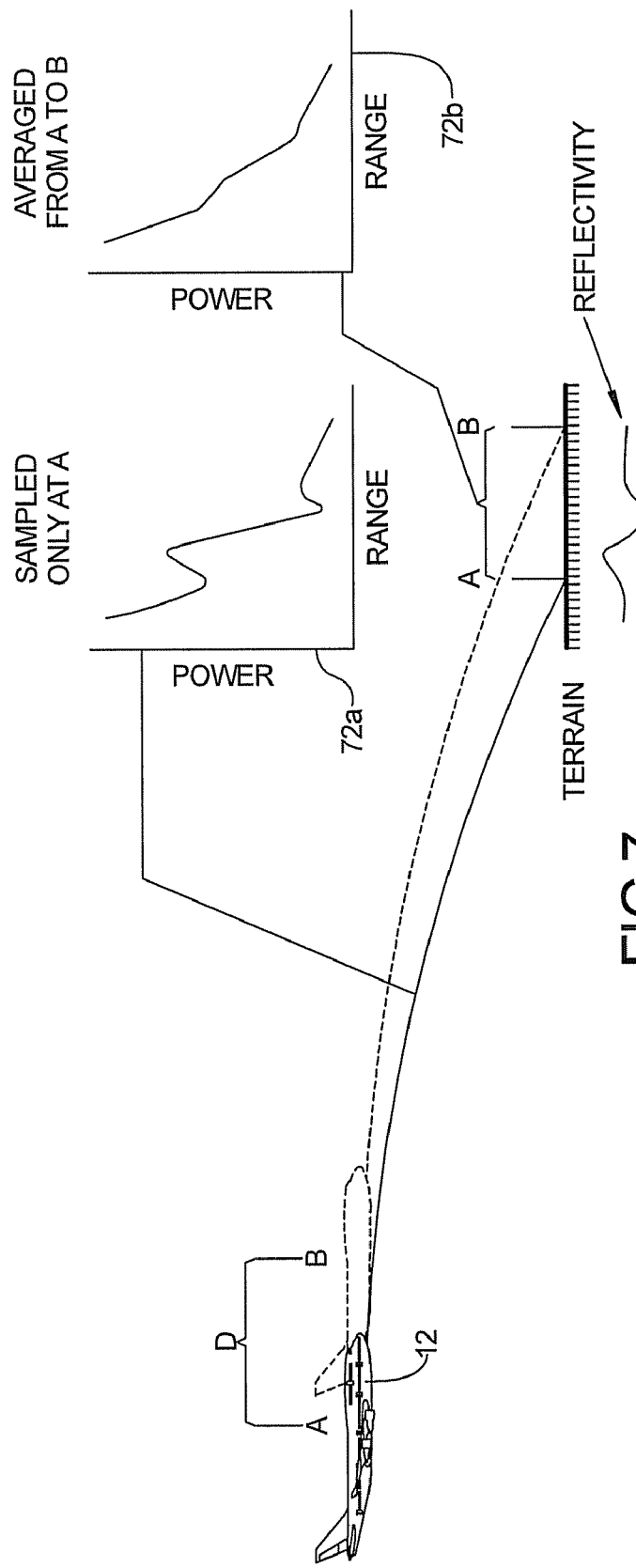
Figure 8A:
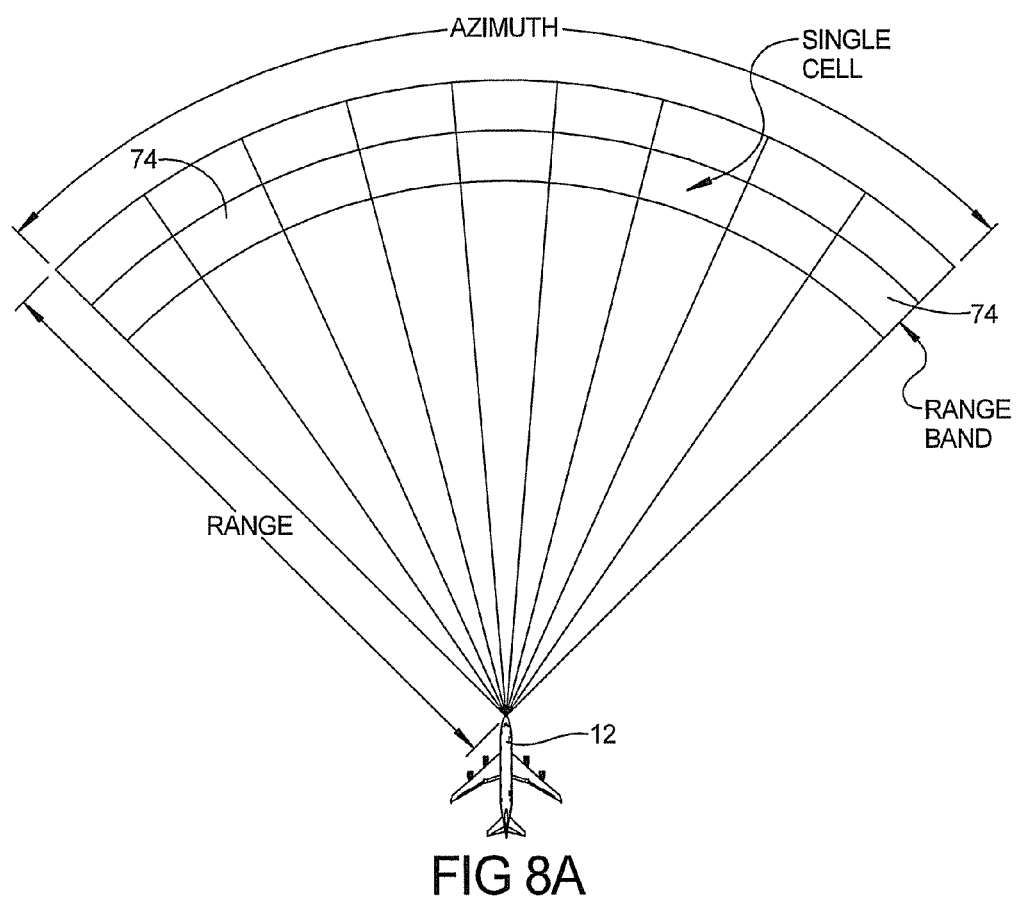
Figure 8B:
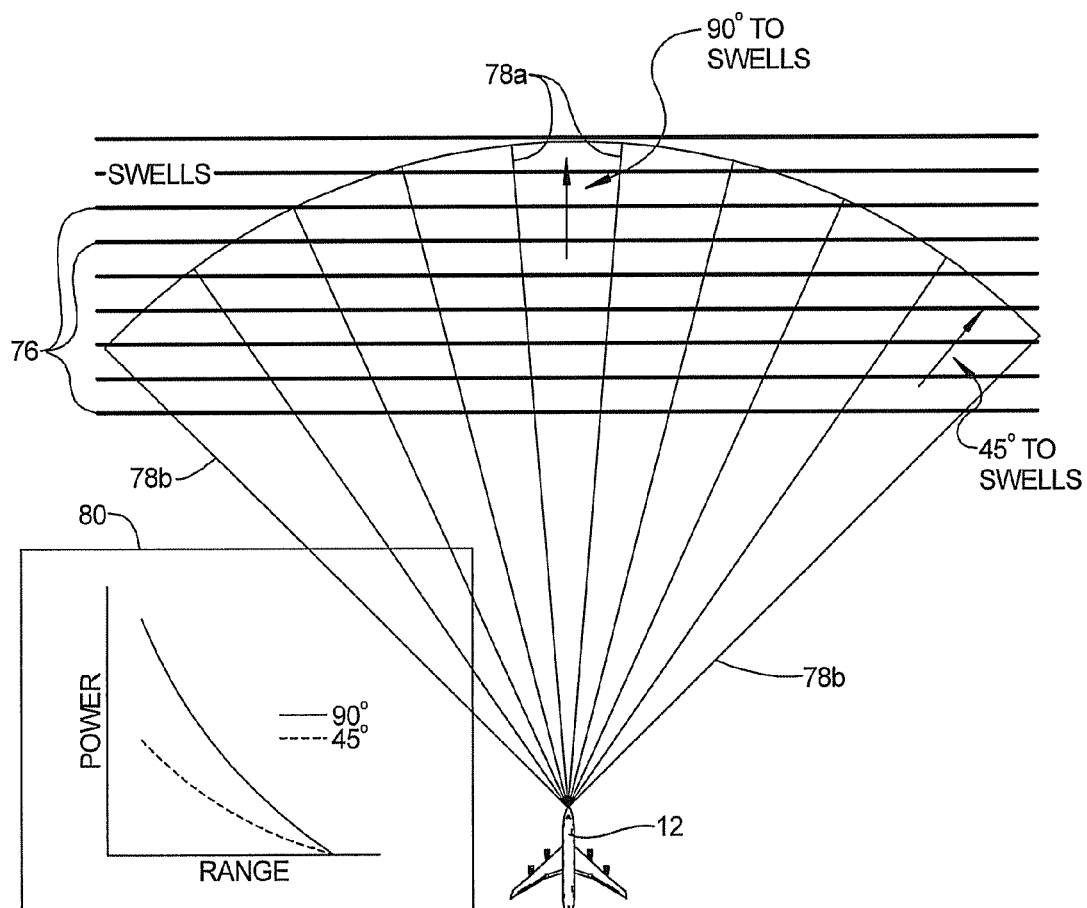
Figure 10:
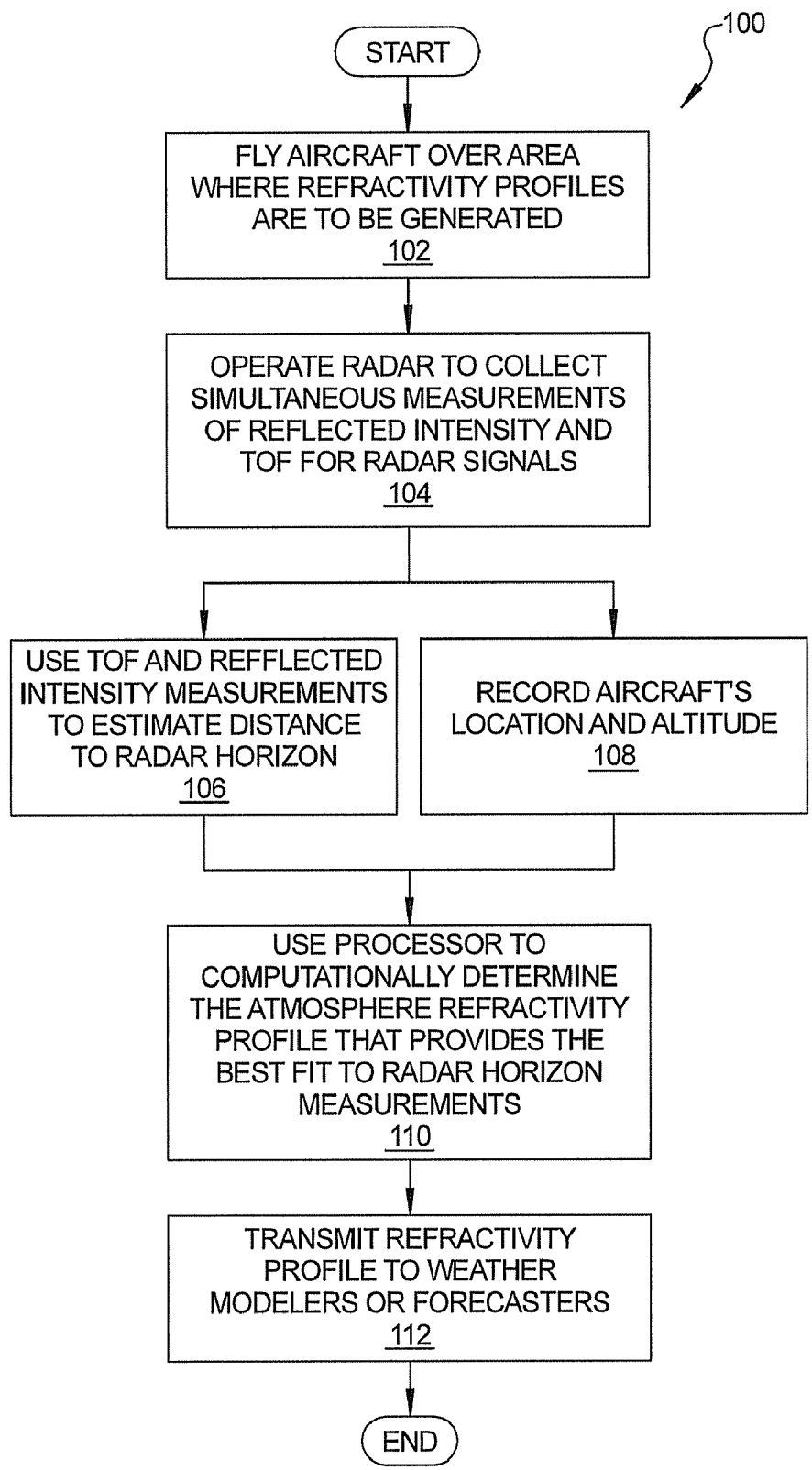
Figure 11:
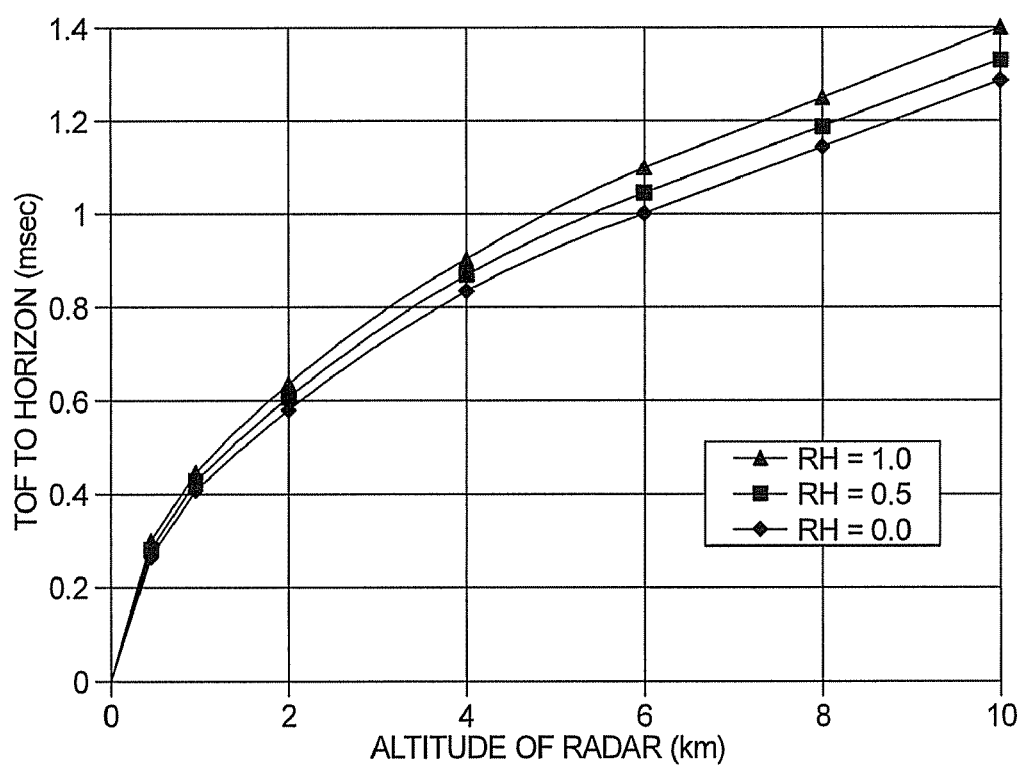
Figure 12:
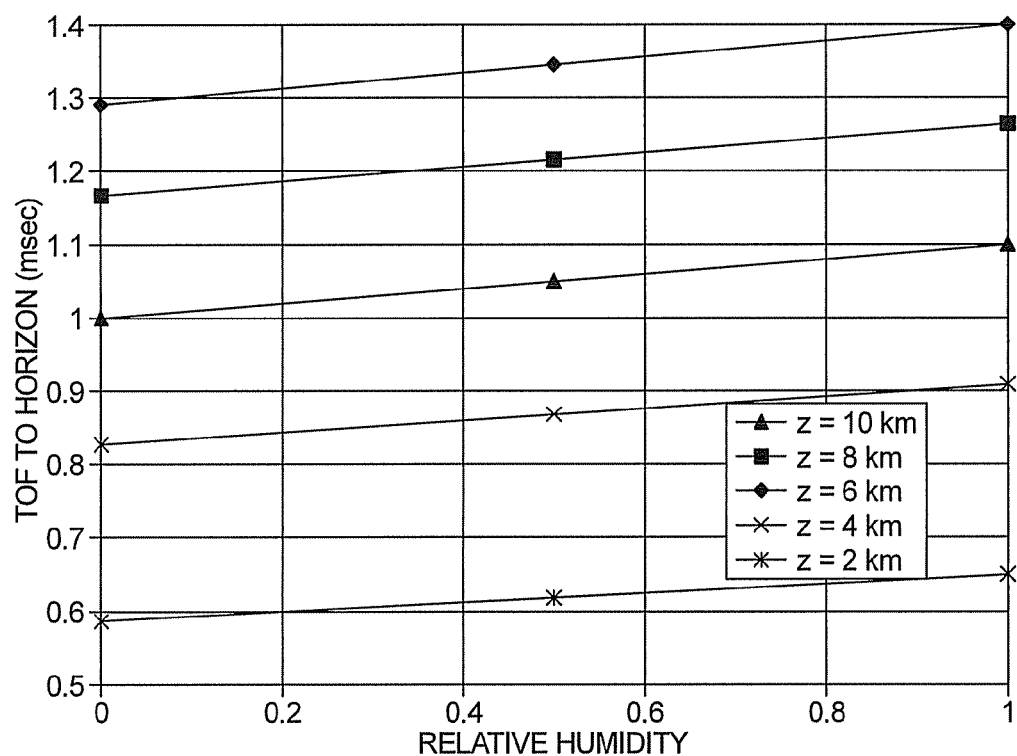
Figure 13:
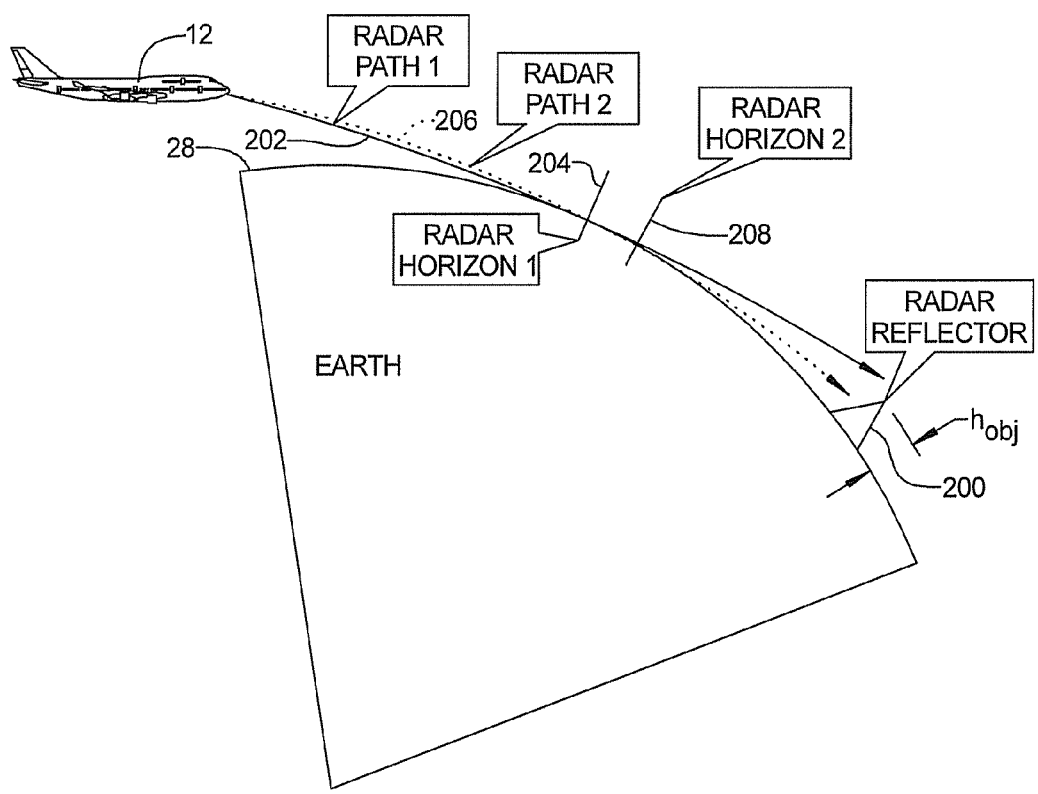
Figure 14B:
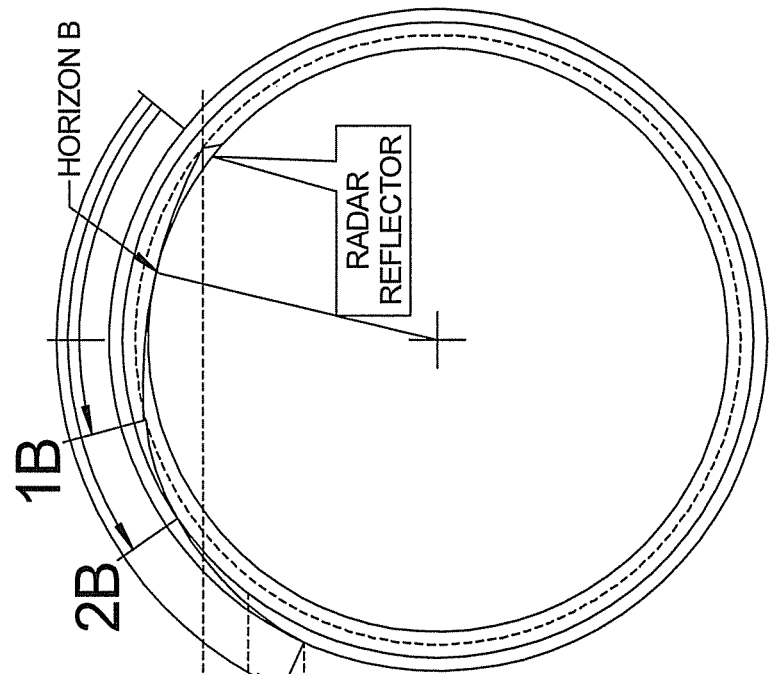
Figure 14A:
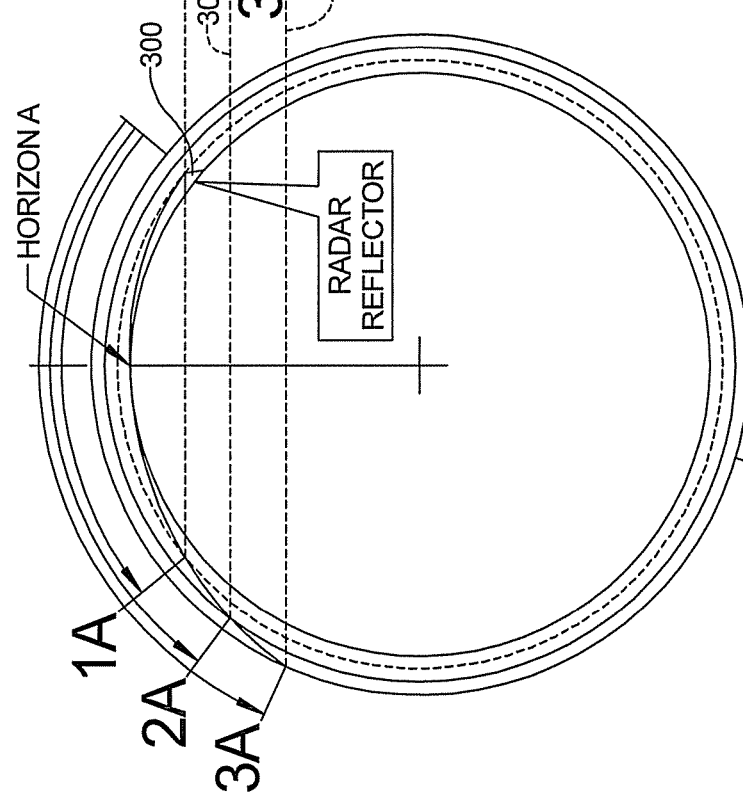
Figure 16A:
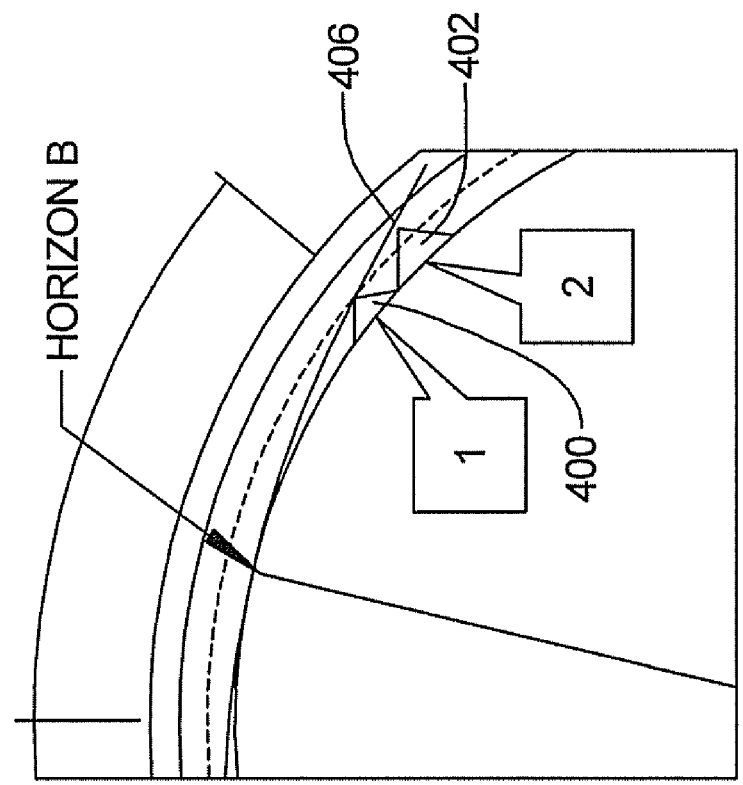
Figure 16B:
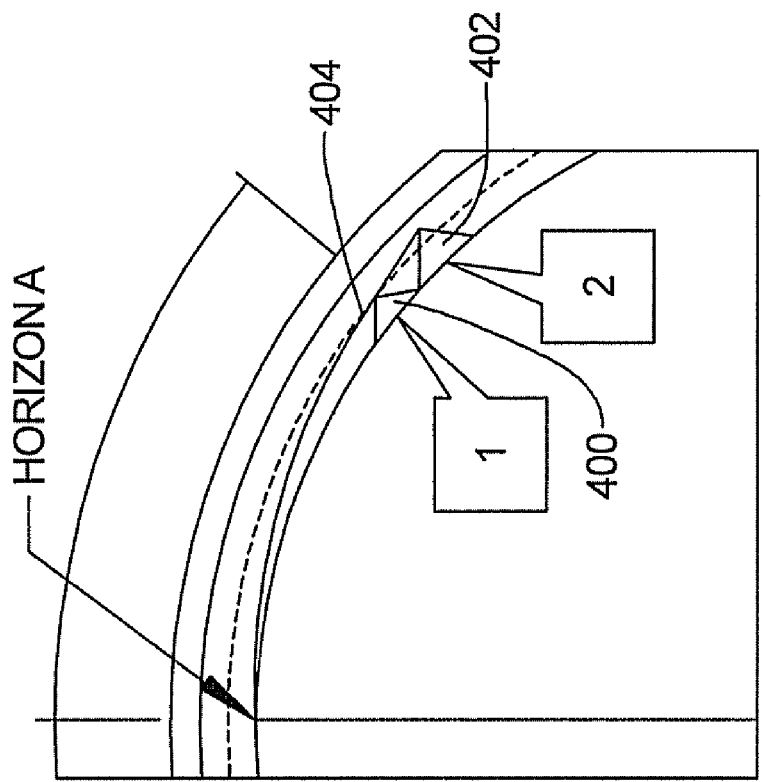

FIG. 1 is a block diagram of one embodiment of the present disclosure;

FIG. 2 is a diagram showing how the Earth's atmosphere bends a radar signal, and how the actual radar "horizon" differs from the geometric horizon that is seen from the aircraft's perspective;

FIG. 3 is a graph of relative power of the reflected radar signal versus range;

FIG. 4 is a diagram showing how stronger bending of the radar signal affects the distance to the radar horizon;

FIG. 5 is a diagram showing how different atmospheric layers of the Earth with different refractivity gradients produce different radar beam path curvatures;

FIG. 6 is a diagram illustrating how different layers of the Earth's atmosphere can provide different refractivity profiles, and how these different refractivity profiles affect the distance to the radar horizon for radar signals traveling through the different atmospheric layers;

FIG. 7 is a diagram showing how averaging may be used with radar signals emitted from a moving aircraft to smooth out the power versus range curve for reflected intensity measurements;

FIG. 8A is a diagram illustrating how the system of the present disclosure may be used to average cells of a radar signal within a given range band;

FIG. 8B is a diagram that shows how the power of a reflected signal varies depending on the angle that the radar signal impinges swells in a large body of water such as an ocean;

FIG. 9 is a diagram showing how uneven terrain changes the grazing angle and the height of the signal's end point;

FIG. 10 is a flowchart setting forth various operations of the system of the present disclosure in generating refractivity profiles;

FIG. 11 is a series of graphs showing how the time of flight (TOF) of a radar signal varies as the radar's altitude is increased, for various levels of relative humidity;

FIG. 12 is a series of graphs that show how different levels of relative humidity affect the TOF of a radar signal emitted from an aircraft when the aircraft is flying at different altitudes;

FIG. 13 shows another embodiment in which radar reflectors beyond the radar horizon can be used to measure refractivity profiles for those situations when the Earth's surface near the horizon is insufficiently reflective to reflect a radar beam;

FIGS. 14A and 14B illustrate how different combinations of strong and weak curvature in each of three different atmospheric layers can give the same detection distance for a given radar reflector;

FIGS. 15A and 15B illustrate another embodiment that may be used where reflectors with various heights are available, and where the different heights can be used to resolve some degree of profile ambiguity with measurements from a single altitude;

FIGS. 16A and 16B show enlarged portions of FIGS. 15A and 15B respectively.

DETAILED DESCRIPTION

The following description is merely exemplary in nature and is not intended to limit the present disclosure, application, or uses.

Referring to FIG. 1 there is shown a system 10 for obtaining refractivity information that may be used to predict atmospheric conditions in a column of atmosphere. As will be described in greater detail in the following paragraphs, the system 10 is adapted to measure the time of flight ("TOF") for a signal from a radar device to reach a radar horizon. The "radar horizon" is the point at which a radar signal is tangent to the Earth's surface.

The system 10 may make use of an airborne mobile platform, for example, but not limited to, a jet aircraft 12. Any other form of airborne platform could be used but because of the speed of modern day jet aircraft, and the distance that can be covered with a jet aircraft in a short period of time, it is expected that the use of a jet aircraft may be the preferred type of airborne mobile platform for many applications.

The jet aircraft 12 may be a commercial or military aircraft that has an onboard system 14 that includes a radar device 16. In this example the radar device 16 is a preexisting component of the aircraft 12 and forms a well known airborne weather radar device. The radar device 16 is in communication with an antenna 18 and an antenna controller 34, which are also preexisting components of the aircraft 12. The radar device 16 generates radar signals 22 from the antenna 18 and receives reflected radar signals 24 back from the Earth's 26 surface 28 via the antenna 18. The radar device 16 typically generates a plurality of received radar signals 22 over short time intervals termed "range gates", and outputs time of flight (TOF) information and information related to the intensity of reflected radar signals received back at the radar device 16. Each range gate thus has a particular TOF and a particular reflected intensity associated with it. The reflected signal intensity will vary depending on the angle that the radar signals impinge the Earth's surface 28. Signals that impinge normal to the Earth's surface will have the highest reflected intensity, while signals that impinge the Earth's surface closest to the radar horizon, labeled with reference number 30 in FIG. 1, will have the lowest signal intensity, or a signal intensity that is nearly zero. The radar horizon is tangent to the Earth's surface 28.

The TOF and reflected signal intensity information output from the radar device 16 are provided to a processor 32. The processor 32 may also be in communication with an antenna controller 34 and able to command the antenna controller 34 to control the elevation and azimuth pointing angles of the antenna 18. The processor 22 may also be in communication with a GPS/Inertial Navigation Unit 36 for providing information to the processor on the location, altitude and attitude of the aircraft 12. An air temperature and barometric pressure monitoring subsystem 38 may be used to provide air temperature and barometric pressure information for the ambient area around the aircraft 12, to the processor 32. The processor 32 may also be in communication with a network 40 that enables refractivity information generated by the processor 32 to be transmitted to a display/output device 42. The display/output device may comprise a video terminal, a printer or any other form of output device that is suitable for presenting information to a user for review. Optionally, the network 40 may also be in wireless communication with a remote substation 44 so that refractivity profiles generated by the processor 32 may be relayed to off-board subsystems or remotely located users.

Furthermore, the remote substation 44 could be used to transmit information concerning weather related variables to the onboard system 14 that the processor 32 may use in generating refractivity profiles. The onboard system 14 may also optionally include a topographic information database 46 that the processor 32 may access to obtain topographic information about the region over which the aircraft 12 is flying. This information may be used to adjust TOF measurements made by the radar device 16.

In general operation, the processor 32 is adapted to receive TOF and reflected signal intensity information output from the radar device 16 and to use this information, by itself or in connection with other information, to determine the refractivity of a column of atmosphere through which the radar signals 22 and 24 have passed. An important factor in determining the refractivity of the atmosphere is the determination of the radar horizon 30, and more specifically the TOF of radar signals to the radar horizon. To understand why the TOF to the radar horizon 30 is useful, consider FIG. 2. With no atmosphere, a radar signal would travel straight, as shown by the dashed line 48. However, the Earth's atmosphere refracts, or "bends", the radar signal's path slightly toward the Earth's surface 28 as shown by the solid curved line 50. Therefore, the radar horizon 30 is farther away from the aircraft 12 than the "geometric horizon", which is labeled with number 52, which is the distance at which a perfectly straight line is tangent to the Earth's surface 28. A more strongly curved path would graze the Earth's surface 28 at an even farther distance from the aircraft 12. The curvature "K" of a one-dimensional path in a two dimensional plane is defined as:

$$K=1/R \qquad \text{Equation (1)}$$

where "R" is the local radius of a section of the path. The curvature of the radar path is proportional to the refractivity gradient of the atmosphere, so the refractivity profile of the atmosphere determines the distance to the radar horizon. Therefore measuring distance to the radar horizon constrains estimates of the refractivity profile.

In practice, the above described processing may be implemented by the use of suitable software with an existing airborne radar device. In other embodiments, this processing may be implemented by adding software to other processing components on the aircraft, where those components are connected to the radar device. In still other embodiments this processing may be implemented by adding a suitable processing component to the aircraft.

As mentioned above, the system 10 is used to determine an estimate of the refractivity of a column of atmosphere. The refractivity enables an estimate of a vertical profile of temperature and water vapor in the atmosphere to be obtained. The refractivity, "N", is related to index of refraction, "n", by:

$$N=(n-1)\times 10^6. \qquad \text{Equation (2)}$$

The refractivity N depends on the air's water content and density, where density is a function of pressure and temperature. An empirical formula is used to calculate the refractivity of a parcel of air as shown in Equation 3 below. In this formula, "T" is the temperature in Kelvin, "$p_d$" is the partial pressure of dry air, "$p_v$" is the partial pressure of water vapor, "$Z_d$" is the inverse compressibility factor for dry air and "$Z_w$" is the inverse compressibility factor for wet air. The constants $k_1$, $k_2$ and $k_3$ are empirically determined.

$$N = k_1\left(\frac{P_d}{T}\right)Z_d^{-1} + \left[k_2\left(\frac{P_v}{T}\right) + k_3\left(\frac{P_v}{T^2}\right)\right]Z_w^{-1} \qquad \text{Equation (3)}$$

Thus, measuring refractivity allows temperature and humidity to be constrained in terms of each other. Given this mutual constraint, and using scientifically-based models of how temperature and humidity vary in the atmosphere, together with ancillary information from other weather instruments and numerical models, weather modelers can use refractivity measurements to compute the most probable estimates of temperature and humidity.

Referring further to FIG. 1, a more detailed description will be provided on how the reflected intensity of the return radar signals is determined. To simplify the description somewhat, reference will be made to a single one of the radar signals 22 that is emitted from the radar device 16. After traveling for some time, the signal 22 reaches the Earth's surface 28. It reflects from the surface 28, with part of the signal returning to the radar. In FIG. 1 the reflected signal is denoted by reference number 24. The total time between when the signal 22 was transmitted and when the signal 24 is received is the TOF.

The radar return intensity for an area is given by:

$$I_r = k\sigma \sin(\psi)/R^4 \qquad \text{Equation (4)}$$

where "k" is a constant proportional to the radar's 16 power and gain, "$\sigma$" is reflectivity, "R" is range, and "$\psi$" is grazing angle. To simplify the analysis, one can assume that the surface roughness is fairly uniform, so $\sigma$ is fairly uniform. This is usually the case for mid-ocean regions spanning several miles. Then near the radar horizon 30, where fractional variation in R is small compared to fractional variation in $\psi$, the return intensity falls almost linearly to zero over a small interval of distance. An example case is shown in FIG. 3. It is therefore easy to extrapolate the curve of power versus distance to find the point where the curve reaches zero power. The "zero-power" point is the radar horizon—about 547 km in this example. Of course, the system 10 actually measures the TOF of the radar signal components 22 and 24, rather than distance. However, the distance depiction in FIG. 3 helps to illustrate this principle.

Referring to the diagram of FIG. 4, a stronger refractivity gradient causes a stronger curvature in the radar signal path. In FIG. 4, radar path 54 (the dotted line) curves more strongly than path 50 (the solid line). The radar horizon 56 for the strongly curved path is more distant from the aircraft 12 than the radar horizon 58 is for the less curved path 50.

If the atmosphere's refractivity gradient was uniform over the radar signal's path, then the path's curvature would be nearly constant. One could treat the radar path and the Earth's surface 28 as two circles that are tangent at the radar horizon. Given the radar's altitude and the distance to the radar horizon, one could easily compute the refractivity gradient from simple geometry. However, in practice, this calculation is not so simple. Various layers of the atmosphere have different refractivity gradients. FIG. 5 illustrates a simple model wherein the refractivity gradient $\nabla n_2$ in the lower layer 60 of the atmosphere is twice as strong as the gradient $\nabla n_1$ in the upper layer 62. The curvature 1/R of a radar path varies, becoming stronger as it crosses from the upper layer 62 ($K_1 = 1/R_1$) to the lower layer 60 ($K_2 = 1/R_2$). In FIG. 5 the curvatures and atmosphere thickness are exaggerated for clarity.

The challenge, then, is to deduce the gradient in each layer 60 and 62 of the atmosphere. Once the gradient is known, the refractivity for any altitude can be computed by starting with the known value of refractivity at the radar's altitude $z_0$ and integrating $\int \nabla n \cdot dz$ down to the desired altitude. A single measurement of radar horizon is usually not sufficient to resolve the gradient in each layer. FIG. 6 illustrates how different combinations of strong and weak curvature in each of three atmospheric layers 64, 66 and 68 can give the same radar horizon. The two drawings of the Earth 26 in FIG. 6 show two different refractivity profiles, but the distance to the radar horizon from a radar at the top of the upper layer 64 is the same in each case, i.e. 3A=3B, as indicated by line 70a. However, the distance 2A to the radar horizon is greater than the distance 2B, as indicated by line 70b. Similarly, the distance 1A to radar horizon is greater than the distance 1B to radar horizon, as indicated by line 70c.

One approach to resolve this ambiguity is to combine the radar horizon measurement with other, non-radar meteorological measurements. Such measurements may comprise surface temperature measurements and wind speed measurements. Physics-based models of atmospheric behavior may also be used to provide information, such as thermodynamic properties of water vapor, that may be used in resolving the above described ambiguity. Collecting numerous dissimilar measurements and collectively using them to form a single "best fit" model of the atmosphere would even further enhance the accuracy of predicted atmospheric conditions. The general term for bringing a measurement into a unified weather model is "assimilation". Modern methods that would be suitable for assimilating a radar horizon measurement with other non-meteorological information include 4D VAR and Kalman ensemble assimilation. Both use statistical methods, together with models of various sensors and atmospheric principles, to minimize an error function. Thus, one embodiment of the present disclosure may include 4D VAR assimilation of isolated measurements of the radar horizon distance into an atmosphere model. Another embodiment may include Kalman ensemble assimilation of isolated measurements of radar horizon distance into an atmosphere model.

Another approach to resolve the radar path curvature ambiguity is to use radar horizon measurements made at various altitudes. In FIG. 6 the radar horizon for both cases is the same when measured from the top of the upper atmospheric layer 64, but is different when measured at the intermediate layer 66 and the lower layer 68. Measuring the horizon distance at an intermediate altitude is analogous to adding one data point to a graph of a curve with known endpoints but unknown form. Adding even a single intermediate point strongly constrains the set of plausible curves that could connect the two endpoints. Measuring the radar horizon distance at several intermediate altitudes gives even better resolution of the refractivity in each layer of the atmosphere. Therefore, one embodiment of the present system 10 may involve measuring the radar horizon at several different altitudes and using the obtained information to even more accurately predict refractivity profiles of the atmosphere.

One way to accomplish radar horizon measurements at multiple altitudes is for a single aircraft to make measurements while it climbs or descends. This gives a particularly accurate profile if the measurements occur during a typical cruising descent where the aircraft trajectory fairly closely matches the forward-looking radar's signal path. In this instance each measurement samples roughly the same patch of air. As a result, horizontal anisotropy of the atmosphere has minimal effect on the estimated refractivity profile.

Another way to accomplish radar horizon measurements at multiple altitudes is for multiple aircraft to make measurements while operating at various altitudes in the same geographic region. Using multiple, diverse aircraft enables different aircraft performing different missions to contribute to a single unified atmospheric model. Therefore, one embodiment of the present disclosure uses radars on multiple aircraft flying at different altitudes to measure radar horizon distances and report them (via a communication system) to a single facility where they are assimilated. Yet another embodiment may accomplish radar horizon measurements at multiple altitudes by mounting a plurality of radar devices at various altitudes on a mountainside, with the mountainside facing either a body of water that extends to the Earth's horizon or towards a similarly wide area of flat terrain where the horizon is clearly visible.

The above discussion treats the radar device 16 as a nearly ideal instrument for measuring the radar horizon distance. In reality, an airborne radar device is not typically operated in a way that supports optimal measurements of the radar horizon. The system 10 therefore may include various operating methods to improve the measurement precision, typically by improving the signal-to-noise ratio (S/N) of the reflected radar signals. In one embodiment the system 10 may average the reflected signal intensity for a given range gate over a large number of radar pulses. This has two benefits. First, it improves the signal to noise ratio. Second, if the radar device 16 is on a moving platform, averaging the reflected intensity over a long time interval causes the platform's motion to smooth out the effect of any anomalously reflective small areas on the Earth's surface, as shown in FIG. 7. In FIG. 7 the reflected intensity power curve 72a produced from sampling while the aircraft 12 is at one position is shown, with a different curve 72b produced when the reflected intensity power is averaged over a given distance "D" of travel of the aircraft 12. Curve 72b will be noted as being a "smoothed" curve from which information can be more accurately extrapolated to find the zero-power point that indicates the radar horizon.

In another embodiment the system 10 may average the reflected intensities of received radar signals over a plurality of azimuth angles. Conventional radars do not operate in this fashion, but rather they treat each range-azimuth cell separately as illustrated in FIG. 8A. The processor 32 of the system 10 averages cells in a given range band, such as the cells 74 in FIG. 8A, to improve the signal-to-noise (S/N) ratio of the received, reflected radar signals. The processor 32 may average only cells from suitable azimuth angles. Suitable azimuth angles may be those where the reflectivity versus range contours are expected to be similar, based on known oceanographic data or known terrain data. An example is when the aircraft 12 is flying over an ocean with swells, with the swells being indicated by reference number 76 in FIG. 8B. Radar signals 78a arriving perpendicular to the swells 76 will be reflected more strongly than radar signals 78b arriving diagonally (i.e., non-normal) to the swells 76. As the notional plot 80 of FIG. 8B shows, however, the shape of the power versus range curve is the same at all azimuth angles, even though the power of the reflected signals is greater with signals directed at 90 degrees to the swells 76. Therefore, cells at all azimuth angles are suitable to contribute to the average reflected signal intensity for each range band. However, if part of the radar coverage area in FIG. 8B included a peninsula where radar reflectivity is different than the ocean, then azimuth angles covering the peninsula would not be suitable for averaging across a range band.

In still another embodiment of the system 10 the strength of the reflected signal from near the horizon may be increased by adjusting the elevation angle of the radar antenna 18 via suitable commands from the antenna controller 34. Airborne radars are typically adjusted to either minimize ground clutter by aiming the radar beam slightly above the horizon or to give a good look at surface features or roughness by aiming the beam below the horizon. In contrast, in this embodiment the system processor 32 and/or antenna controller 34 may be used to adaptively adjust the elevation angle of the antenna 18 to maximize the reflected signal strength near the horizon. This can even further improve the signal-to-noise ratio of the reflected radar signal.

Another adaptive embodiment of the system 10 may detect regions of precipitation in weather radar data. The system 10 uses this to identify azimuth angles where the signal at the radar horizon is significantly attenuated by airborne water. By "significantly attenuated" it is meant that either the signal-to-noise ratio of the reflected radar signal is too weak for a suitable measurement or that precipitation near the horizon may alter the returning signal intensity versus range. More specifically, it may change the zero-power point of the curve in FIG. 3. Accordingly, in this embodiment the system 10 ignores horizon measurements at any azimuth angles where it detects significant attenuation.

A particular advantage of the system 10 is how the system 10 handles complications that arise due to reflected signals from non-ideal surfaces. For example, when radar signals strike ocean waves the signals reflect from different heights depending on the angle at which each signal strikes the water surface. A nearly vertical signal reflects from points near the trough of the wave. A more horizontal signal reflects from points on the slope or crest of the wave. Thus, another embodiment of the system 10 may use a wave-reflection model, such as that disclosed in "Surface Roughness Estimation from GPS Sea Reflections," Thompson et al., NASA Earth Science Enterprise, IEEE Geoscience and Remote Sensing Symposium, 2002, hereby incorporated by reference into the present disclosure, to estimate the distribution of wave shapes and correct the TOF and reflectivity for signals reaching the waves at different angles. Briefly, such a wave reflection model may make use of scattering models commonly employed in the analysis of GPS surface reflection signals. Recorded waveforms from GPS surface reflections may be derived from a radar equation as a convolution between the radar cross-section and the elementary GPS correlator, as:

$$y_{pq}^2(\tau) = \Lambda^2(\tau) * \sigma_{pq}^0(f(\tau)) \tag{1}$$

and neglect the effects of the antenna gain and Doppler shifts in the computations. Function $f(\tau)$ in (1) transforms the bistatic geometry into delay time $\tau$, Triangle shape correlator $\Lambda^2(\tau)$ represents the response of a flat surface. Most of the physics that determines the form of the received waveforms is contained in the bistatic radar cross-section, $\sigma_{pq}^0$ where p and q refer to the incident and scattered polarization, respectively. In the Kirchhoff approximation for a perfectly-conducting surface, $\sigma_{pq}^0$ may be written as:

$$\sigma_{pq}^0 = q_z^2 T_{pq} \frac{1}{2\pi} e^{iq_z[\eta(\vec{x}_1) - \eta(\vec{x}_2)]} e^{i\vec{q}_H(\vec{x}_1 - \vec{x}_2)} d(\vec{x}_1 - \vec{x}_2) \tag{2}$$

where the vector $q = q_H + q_z \hat{e}_z$ is the difference between the scattered and incident electromagnetic wavenumber, $\eta(\vec{x}_1) - \eta(\vec{x}_2)$ is the difference between the surface height at $\vec{x}_1$ and $\vec{x}_2$, respectively, and the symbol $<...>$ indicates ensemble averaging. The Kirchhoff approximation imposes the restriction that the local curvature of the surface be small and is conventionally derived from the first iteration of the surface-current integral equation. The polarization coefficient, $T_{pq}$, is given by:

$$T_{pq} = 2|\hat{P}_s^q \cdot \vec{\Pi}(\hat{P}_i^p)|^2, \quad (3)$$

where the bistatic scattering vector is $$\vec{\Pi}(\hat{P}_i^p) = \frac{\vec{q}}{q_z} \times \hat{P}_i^p \times \frac{\vec{k}_s}{k}. \quad (4)$$

The quantities $\hat{P}_i^p$ and $\hat{P}_s^q$ are the unit polarization vectors of the incident and scattered magnetic fields, respectively.

All of the methods discussed above work well when the Earth's surface is level. However, it will be appreciated that the Earth's surface cannot be perfectly smooth, however, or the surface will not reflect radar signals back toward their source. Another embodiment of the system 10 may be implemented that is especially well suited for applications where the earth's surface is not level, for example in regions of rolling hills. With this embodiment the terrain's altitude variations are represented by a terrain database, such as topographic database 46 in FIG. 1. The system 10 uses the topographic database 46, the aircraft's 12 position, and geometric optics formulas to adjust various grazing angle values to account for the terrain characteristics. This embodiment may be further explained In connection with the drawing of FIG. 9. The system 10 uses the topographic database 46 to predict that radar signals emitted from the aircraft 12 at location A, with a particular time of flight, will reflect from a patch 82 of terrain that tilts toward the radar device 16, or is substantially normal to the path of the emitted radar signal. The database 46 is also used to predict that radar signals emitted at location B of the aircraft 12 with the same time of flight will reach the Earth's surface at a patch 84 that tilts away from the radar device 16. The system 10 multiplies the reflected intensity at each range-azimuth cell by a factor that accounts for the actual grazing angle versus the nominal "level terrain" grazing angle in Equation 5, thereby computing an even more accurate estimate of radar return signal intensity $I_r$.

With further reference to FIG. 9, in still another embodiment of the system 10, the system may use a terrain database to predict that radar signals emitted from the aircraft 12 at location A with a particular TOF will reach the Earth at a height "$h_A$" above nominal sea level, while signals emitted at location B with the same TOF will reach the Earth at height "$h_B$". For areas over large bodies of waters such as oceans, the terrain database may comprise an up-to-date database of tides, winds, and other factors that affect ocean surface height. The system 10 may use this information to adjust the calculated path of the radar signal, and thereby to improve the estimated refractivity profile.

Referring now to FIG. 10 a flowchart 100 is shown setting forth various operations that the system 10 may perform in determining the refractivity of a column of atmosphere. It will be assumed that the on-board system 14 of FIG. 1 is installed on the aircraft 12 and that the processor 32 is loaded with suitable software for analyzing the TOF and reflected intensity information output by the radar device 16. Initially at operation 102 the aircraft 12 is flown over a predetermined area where refractivity profiles of the atmosphere are to be generated. At operation 104 the radar 16 is operated to collect simultaneous measurements of reflected intensity and TOF to points on the Earth 26. At operation 106 the obtained TOF and reflected intensity measurements are used to estimate the distance to the radar horizon. Concurrently, at operation 108, the aircraft's 12 location and altitude is recorded. Optionally, the radar device 16 may be scanned over a range of elevation or azimuth angles at operation 104 to obtain reflected signals with even better signal-to-noise ratios at the radar horizon.

At operation 110, the processor 32 may be used to computationally determine the atmosphere refractivity profile that gives the best fit to the radar horizon measurements. Where other measurements are available, such as radiosonde measurements or radar occultation data from multiple airplanes, such measurements and/or information may also be used to determine the atmospheric profile that best fits all the available data. At operation 112 the refractivity profile may be transmitted to weather modelers or forecasters. By this it is meant that the refractivity information may be displayed on the display device 42 (FIG. 1) of the on-board system 14 or transmitted wirelessly to the remote substation 44. It will be appreciated, however, that in a typical application, the radar device 16 will be used part time to perform refractivity measurements and part time to perform normal radar actions such as measuring precipitation rates and turbulence, or even scanning for potentially hostile vehicles or objects.

The system 10 in its various embodiments thus measures refractivity profiles along its flight path. The refractivity profiles can be used to improve atmospheric models, especially models of water vapor, and thereby to improve weather forecasts. The system 10 is expected to have particularly high utility and value when used in parts of the world with few existing weather instruments, such as China, India, or for predicting weather conditions/patterns over the world's oceans. The system 10 in its various embodiments is also expected to find significant utility in military theaters of operation where it is important to mission success to be able to predict weather conditions.

It is a particularly desirable feature of the various embodiments of the system 10 that the system is able to generate refractivity profiles of the atmosphere without the need to add special antennas to existing aircraft. In some embodiments the refractivity profile information can be obtained by the system 10 without adding any electronic boxes on an existing aircraft. The ability to obtain refractivity measurements without the need to integrate new hardware onto the aircraft significantly reduces the cost of the system 10. The system 10 is also advantageous as its implementation on an existing aircraft does not involve adding any significant weight to the aircraft.

With respect to previously developed or used weather prediction systems, the system 10 has a number of important benefits. Unlike radiosonde measurements, the system 10 provides coverage wherever an aircraft is able to fly. This includes less developed nations and the large portions of the earth covered by seas and oceans. When compared to dropping small parachute packages from aircraft, the system 10 has relatively low recurring cost and raises no safety or environmental issues. Unlike GPS occultation with satellites, the system 10 makes effective measurements from cruising altitude all the way to the ground. In addition, the system 10 is able to provide even better spatial and temporal coverage than low earth orbit (LEO) satellite occultation. When compared with occultation measurements from aircraft, the system 10 makes measurements all the way to the ground and it requires no additional antennas or occultation receivers. It therefore can offer significantly lower cost to implement that other types of weather prediction systems. And unlike reflected signal occultation, the system 10 requires no additional antennas or occultation receivers. The system 10 is also able to provide greater geographic and temporal coverage, greater vertical coverage (especially in the lower troposphere), and lower cost than previously developed systems.

Referring to FIGS. 11 and 12, results of simulations of operation of the system 10 are shown where the system is operating over level terrain. This model propagates a reflected radar signal from the radar horizon to the radar device. It outputs one-way time of flight. FIG. 11 shows how the time of flight varies as the radar's altitude increases from zero to 10,000 meters. The three curves show the effect of varying humidity. The horizon is more distant at low humidity, regardless of altitude.

FIG. 12 even more clearly illustrates how the time of flight varies with humidity at a given measurement altitude. Each curve corresponds to an altitude (z) of the radar. The TOF difference between zero humidity and 100% humidity is about 100 microseconds (one way) at the cruise altitude of a jet aircraft. That corresponds to the horizon distance changing by about 30 km. An airborne weather radar can easily resolve such a large difference, and by averaging over several pulses, it can resolve TOF differences corresponding to relatively small changes in humidity.

With reference to FIG. 13, in yet another embodiment the present disclosure detects "beyond the horizon" radar reflectors. This embodiment is able to measure refractivity profiles even when the Earth's surface 28 near the horizon is insufficiently reflective to use the prior embodiments, such as over water in calm weather. FIG. 13 shows how this embodiment works. A radar reflector 200, such as a mountain or a ship, sticks up above the non-reflective surface. From the aircraft's 12 position, the weakly curved radar beam 202 skims the surface 28 at radar horizon 204 and passes above the reflector 200, so no reflection occurs. However, strongly curved radar beam 206 skims the surface 28 at radar horizon 208 and strikes the reflector 200, so part of the radar signal is reflected and is detected by the aircraft's radar device 16. Thus, radar detection of the reflector 200 by an aircraft at the position shown indicates that the refractivity profile must produce a path with more curvature than the path indicated by beam 202.

In the embodiment shown in FIG. 13, the present disclosure uses a measurement of the maximum distance at which the radar reflector 200 is detected, together with information about the location and the height "$h_{obj}$" of the reflective object and the height of intervening terrain (if any) or water, to estimate the refractivity profile, or to generate data that is assimilated with other types of data to estimate an atmospheric profile. For stationary features such as mountains, islands or tall buildings, a geographic information system (GIS) may determine height and exact location, given the approximate location estimated by combining aircraft location and heading with the radar range measurement and azimuth angle. For marine environments, the approximate location of ships and buoys may be determined by combining aircraft location and heading with the radar range measurement and azimuth angle. The approximate location is then used to identify a particular ship or buoy using a suitable tracking database and to estimate its effective height as a radar reflector. For airborne reflectors, i.e. aircraft, the precise location and altitude may be determined either by the response from an encoding transponder (such as in the Traffic Alert and Collision Avoidance System, or TCAS) or by using the reflector's location to retrieve precise location and altitude from an Air Traffic Management database.

For a reflector that is vanishingly small at the top, such as a pyramid-shaped mountain, very little energy is reflected when the bottom edge of the radar beam touches the top few inches of the reflector. Thus, it may be impossible to directly measure the maximum distance at which the radar reflector peeks above the radar horizon. Instead, estimating the maximum detection distance may involve the use of an extrapolation operation similar to that for FIG. 3, but with two differences in the underlying physics: 1) reflected power decreases with range due to the reduced fraction of the reflector's area that protrudes into the radar beam at longer range, rather than due to the reduced grazing angle of the beam on a broad surface, and 2) the reflected power vs. range is measured over a series of pulses as the aircraft approaches the reflector, rather than as a series of measurements at different TOF within a single pulse. Extrapolating the power-vs-range curve for the reflector allows one to estimate the distance at which the power reflected from the reflector drops to zero, i.e. the true maximum detection distance.

A further variation of the above process involves measuring the detection distance from multiple altitudes to resolve the refractivity gradient in various layers of the atmosphere. FIGS. 14A and 14B illustrate how different combinations of strong and weak curvature in each of three layers can give the same detection distance for a given radar reflector. FIGS. 14A and 14B show two different refractivity profiles. The detection distance to the radar reflector 300 from a radar at the top of the upper layer 302 is the same in each case, as indicated by line 304 (i.e. 3A=3B), but is different when measured at intermediate altitudes. For the cases shown, radar detection distance at intermediate altitudes is greater in the left-hand case, as indicated by line 304 (i.e. 2A>2B) and line 306 (i.e., 1A>1B). Measuring the detection distance at an intermediate altitude is analogous to adding one data point to a graph of a curve with known endpoints but unknown form: even a single intermediate point strongly constrains the set of plausible curves that could connect the two endpoints. Measuring the detection distance at several intermediate altitudes gives even better resolution of the refractivity in each layer of the atmosphere.

Where reflectors with various heights are available, one can resolve some profile ambiguity with measurements from a single altitude. FIGS. 15A and 15B show the same two refractivity profiles as shown in FIGS. 14A and 14B. In this case, two mountains 400 and 402 with different heights are beyond the radar horizon. FIGS. 16A and 16B provide enlarged views of the reflectors 400 and 402 and the radar paths 404 and 406. In FIG. 16A, for the refractivity profile, the radar beam 404 touches (i.e. detects) reflector 402 from the same position at which it detects reflector 400, though reflector 204 is taller and farther away. For the refractivity profile shown in FIG. 16B, the radar beam 406 touches reflector 400 from the same position as for the profile shown in FIG. 16A, but the radar beam passes above reflector 402 without touching it. Thus, one can distinguish between different refractivity profiles by using a radar at a single altitude to measure the detection distance for radar reflectors with different heights.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for determining a refractivity profile of an atmosphere of the Earth, the method comprising:
   generating radar signals from a radar device located above the Earth's surface toward the Earth's surface;
   measuring a time of flight and a reflected intensity of reflected radar signals received back at said radar device;
   using the measured time of flight and said reflected intensity of said reflected radar signals received by said radar device to determine a distance to a radar horizon where the radar signals are tangent to the Earth's surface; and
   using the distance to the radar horizon to determine a refractivity profile of the atmosphere through which said radar signals and said reflected radar signals have travelled.

2. The method of claim 1, wherein said generating radar signals from a radar device comprises generating radar signals from a radar device located on an airborne mobile platform.

3. The method of claim 2, wherein said generating radar signals from an airborne mobile platform comprises generating radar signals from an aircraft.

4. The method of claim 1, wherein said generating radar signals from a radar device comprises generating radar signals from a radar device located at a fixed, elevated position on the Earth with the radar device having a view toward a horizon of the Earth.

5. The method of claim 1, further comprising measuring at least one of air temperature and barometric pressure in a vicinity of the radar, and using said at least one of said temperature and said barometric pressure in determining said refractivity profile.

6. The method of claim 1, further comprising assimilating said time of flight and said reflected intensity with at least one of:
   measurements taken without the use of said radar signals; and
   a model of atmospheric behavior that provides information relating to thermodynamic properties of water, to determine said refractivity profile.

7. The method of claim 1, wherein said generating a plurality of radar signals comprises generating a plurality of radar signals at different altitudes.

8. The method of claim 1, further comprising averaging the intensities of a subplurality of said plurality of reflected radar signals over a given range gate.

9. The method of claim 1, further comprising averaging the reflected signal intensities over a plurality of selected azimuth angles.

10. The method of claim 1, further comprising controlling an elevation angle of an antenna associated with said radar device to maximize a strength of said reflected radar signals near said horizon.

11. The method of claim 1, further comprising using a terrain database in connection with at least one of:
   a location of said radar; and
   geometric optics formulas;
   to adjust an elevation angle of an antenna emitting said radar signals from said radar device, to account for known terrain characteristics.

12. The method of claim 1, further comprising using at least one of:
   a topographic database;
   an air traffic database;
   an altitude-encoding transponder; and
   a ship traffic database;
   to determine the altitude of a first radar reflector that reflects a signal toward said radar device from beyond a radar horizon, and using the maximum distance at which said first radar reflector is detected to estimate a refractivity profile.

13. The method of claim 12, further comprising using a second radar reflector that reflects a signal toward said radar device from beyond a radar horizon, said second reflector being located at a different altitude than said first reflector, and using the maximum distances at which said first and second reflectors are detected to estimate a refractivity profile.

14. A method for determining a refractivity profile of an atmosphere of the Earth, the method comprising:
   generating radar signals from a radar device located on an airborne mobile platform toward the Earth's surface;
   receiving ones of said radar signals that are reflected back to said radar device;
   measuring a time of flight and a reflected intensity of said radar signals reflected back at said radar device over a plurality of range gates;
   using the measured time of flight and said reflected intensity of said radar signals received by said radar device, to determine an approximate distance to a radar horizon where the radar signals are tangent to the Earth's surface; and
   assimilating the distance from the mobile platform to the radar horizon, and at least one additional measurement obtained without the use of said radar signals, to determine a refractivity profile of the atmosphere through which said radar signals have travelled.

15. The method of claim 14, wherein said generating radar signals from a radar device comprises generating a plurality of radar signals at different altitudes of said mobile platform.

16. The method of claim 14, further comprising averaging the intensities of a subplurality of said radar signals reflected back to said radar device, over a given one of said range gates.

17. The method of claim 14, further comprising controlling an elevation angle of an antenna associated with said radar device to maximize a strength of said radar signals that are reflected back to said radar device from near said horizon.

18. The method of claim 14, further comprising using a topographic database in connection with at least one of:
   a location of said radar device; and
   geometric optics formulas;
   to adjust an estimated grazing angle of a radar signal reflected from a particular patch of terrain toward said radar device, and using said estimated grazing angle together with the measured intensity of the reflected radar signal to compute an estimated intensity of a radar signal reflected from a hypothetical patch of level terrain at the same location.

19. A system for determining a refractivity profile of an atmosphere of the Earth, the system comprising:
   a radar device located at an elevated location providing a view of the Earth's horizon, being adapted to emit radar signals toward the Earth's surface;
   a processor adapted to analyze time of flight information for ones of said radar signals reflected back to, and received by, said radar device, and adapted to determine a time of flight of flight of said radar signals to a radar horizon, the processor further being adapted to use said time of flight and information relating to an intensity of said reflected ones of said radar signals to determine a refractivity profile for a portion of an atmosphere of said Earth that said radar signals have travelled through.

20. The system of claim 19, further comprising a subsystem for measuring the position and altitude of the radar device and providing information relating thereto to said processor.

21. The system of claim 19, further comprising a subsystem that provides air temperature and barometric pressure information to said processor.

22. The system of claim 19, further comprising a network for transmitting said refractivity profile generated by said processor to a remotely located substation.

* * * * *